United States Patent
Henry et al.

(10) Patent No.: US 11,159,826 B2
(45) Date of Patent: Oct. 26, 2021

(54) METHOD FOR ENCODING AND DECODING IMAGES, ENCODING AND DECODING DEVICE, AND CORRESPONDING COMPUTER PROGRAMS

(71) Applicant: Orange, Issy-les-Moulineaux (FR)

(72) Inventors: Felix Henry, Chatillon (FR); Joel Jung, Chatillon (FR); Bappaditya Ray, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 86 days.

(21) Appl. No.: 16/493,624

(22) PCT Filed: Mar. 12, 2018

(86) PCT No.: PCT/FR2018/050579
§ 371 (c)(1),
(2) Date: Sep. 12, 2019

(87) PCT Pub. No.: WO2018/167419
PCT Pub. Date: Sep. 20, 2018

(65) Prior Publication Data
US 2020/0084477 A1     Mar. 12, 2020

(30) Foreign Application Priority Data
Mar. 16, 2017   (FR) ...................................... 1752143

(51) Int. Cl.
*H04N 19/00*   (2014.01)
*H04N 19/70*   (2014.01)
(Continued)

(52) U.S. Cl.
CPC ........... *H04N 19/70* (2014.11); *H04N 19/102* (2014.11); *H04N 19/136* (2014.11);
(Continued)

(58) Field of Classification Search
CPC .. H04N 19/176; H04N 19/597; H04N 19/167; H04N 19/174; H04N 19/61;
(Continued)

(56) References Cited

U.S. PATENT DOCUMENTS

| 2010/0158135 A1* | 6/2010 | Yin ...................... H04N 19/895 |
| | | 375/240.26 |
| 2016/0112704 A1 | 4/2016 | Grange et al. |

(Continued)

FOREIGN PATENT DOCUMENTS

| WO | 2006094035 A1 | 8/2006 |
| WO | 2007047077 A2 | 4/2007 |

(Continued)

OTHER PUBLICATIONS

English translation of the Written Opinion of the International Searching Authority dated Jun. 1, 2018 for corresponding International Application No. PCT/FR2018/050579, filed Mar. 12, 2018.

(Continued)

*Primary Examiner* — Li Liu
(74) *Attorney, Agent, or Firm* — David D. Brush; Westman, Champlin & Koehler, P.A.

(57) ABSTRACT

A method of encoding at least one image divided into blocks, implementing: encoding a first syntax element associated with a characteristic of the at least one image; encoding, for a current block to be encoded associated with at least one encoding parameter, the data of the current block; if the first syntax element is encoded according to a first predefined value representing the characteristic of the image, a second syntax element representing the value of the at least one encoding parameter is encoded only if the current block belongs to a predefined zone of the image; if the first syntax element is encoded according to a second predefined value representing the characteristic of the
(Continued)

image, the second syntax element is encoded, whether or not the current block belongs to the predefined zone.

14 Claims, 10 Drawing Sheets

(51) Int. Cl.
  *H04N 19/102*    (2014.01)
  *H04N 19/136*    (2014.01)
  *H04N 19/176*    (2014.01)
  *H04N 19/46*     (2014.01)
  *H04N 19/61*     (2014.01)

(52) U.S. Cl.
  CPC ........... *H04N 19/176* (2014.11); *H04N 19/46* (2014.11); *H04N 19/61* (2014.11)

(58) Field of Classification Search
  CPC .... H04N 19/70; H04N 19/102; H04N 19/503; G06T 11/00
  See application file for complete search history.

(56) References Cited

U.S. PATENT DOCUMENTS

| | | | |
|---|---|---|---|
| 2019/0110076 A1* | 4/2019 | Lim | G06T 5/006 |
| 2019/0253719 A1* | 8/2019 | Wang | H04N 19/146 |
| 2019/0281319 A1* | 9/2019 | Galpin | H04N 19/182 |
| 2019/0289290 A1* | 9/2019 | Kawamura | H04N 19/176 |

FOREIGN PATENT DOCUMENTS

| | | |
|---|---|---|
| WO | 2009102503 A2 | 8/2009 |
| WO | 2017158236 A2 | 9/2017 |

OTHER PUBLICATIONS

HEVC standard "High Efficiency Video Coding (HEVC)" Series H: Audiovisual and Multimedia Systems, Infrastructure of audiovisual services—Coding of moving video, ISO/IEC/23008-2 Recommendation ITU-T H.265, dated Apr. 2013.

Chih-Ming Fu et al., "Sample Adaptive Offset in the HEVC Standard" Published in: IEEE Transactions on Circuits and Systems for Video Technology (vol. 22, Issue: 12, Dec. 2012).

Lino Ferreira et al: "H.264/SVC ROI Encoding With Spatial Scalability", Jul. 26, 2008 (Jul. 26, 2008).

Sejin Oh et al: "SEI message for signaling of 360-degree video information", 26. JCT-VC Meeting; Dec. 1, 2017-Dec. 20, 2017; Geneva; (Joint Collaborative Team on Video Coding of ISO/IEC JTC1/SC29/WG11 and ITU-T SG.16 ); URL: http://wftp3.itu.int/av-arch/jctvc-site/ , No. JCTVC-Z0026. Jan. 4, 2017 (Jan. 4, 2017).

International Search Report dated May 24, 2018 for corresponding International Application No. PCT/FR2018/050579, filed Mar. 12, 2018.

Written Opinion of the International Searching Authority dated May 24, 2018 for corresponding International Application No. PCT/FR2018/050579, filed Mar. 12, 2018.

* cited by examiner

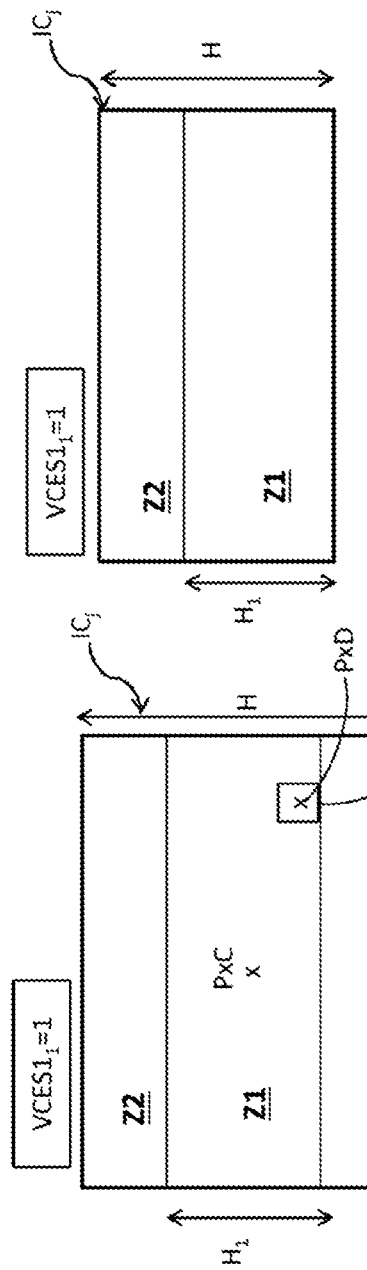
FIG.4A
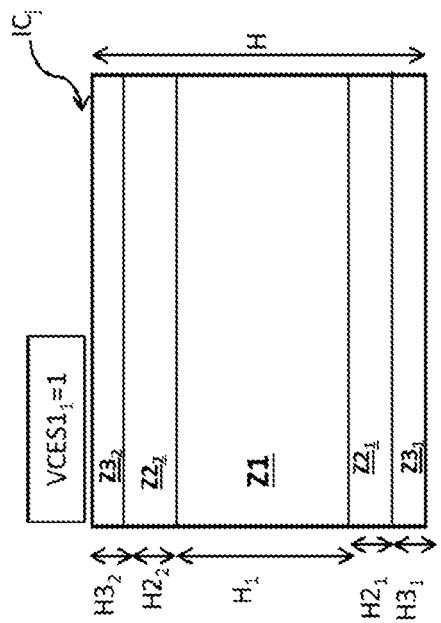
FIG.4B
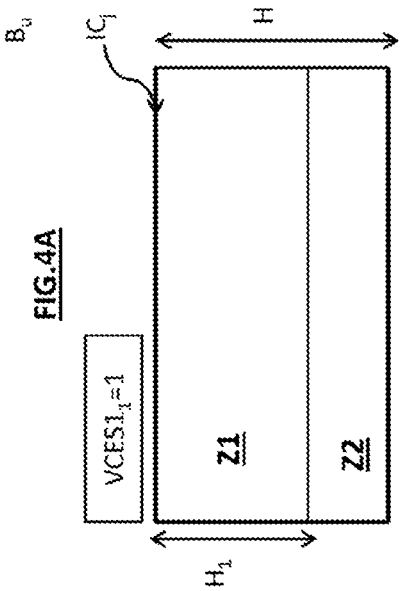
FIG.4C
FIG.4D

METHOD FOR ENCODING AND DECODING IMAGES, ENCODING AND DECODING DEVICE, AND CORRESPONDING COMPUTER PROGRAMS

CROSS-REFERENCE TO RELATED APPLICATIONS

This Application is a Section 371 National Stage Application of International Application No. PCT/FR2018/050579, filed Mar. 12, 2018, the content of which is incorporated herein by reference in its entirety, and published as WO 2018/167419 on Sep. 20, 2018, not in English.

FIELD OF THE INVENTION

The present invention pertains generally to the field of image processing, and more precisely to the coding and decoding of parameters of digital images, whether these digital images are fixed or form part of a sequence of digital images.

The coding/decoding of such image parameters applies in particular to images arising from at least one video sequence comprising:
- images arising from one and the same camera and following one another temporally (coding/decoding of 2D type),
- images arising from various cameras oriented according to different views (coding/decoding of 3D type),
- corresponding components of texture and depth (coding/decoding of 3D type),
- images obtained by projection of a 360° video,
- etc . . .

The present invention applies in a similar manner to the coding/decoding of parameters of images of 2D or 3D type.

The invention may in particular, but not exclusively, be applied to the video coding implemented in current AVC and HEVC video coders and their extensions (MVC, 3D-AVC, MV-HEVC, 3D-HEVC, etc), and to the corresponding decoding.

BACKGROUND OF THE INVENTION

Current video coders (MPEG, H.264, HEVC, . . . ) use a block-wise representation of the video sequence. The images are split into blocks, which might be re-split, for example in a recursive manner as in the HEVC standard.

For a current block which is to be coded, the image parameters associated with this block are coded in the form of bits with the aid of a suitable coding scheme implemented by a coder, such as for example an entropy coder, the aim of which is to code these parameters without loss.

Such parameters are for example:
- the residual coefficients of prediction of the pixels of the current block,
- the mode of prediction of the current block (Intra prediction, Inter prediction, default prediction carrying out a prediction for which no information is transmitted to the decoder (in English "skip"),
- information specifying the type of prediction of the current block (orientation, reference image, . . . ),
- the type of splitting of the current block,
- the motion information of the current block if necessary,
- etc.

The bits obtained after entropy coding are written to a data signal which is intended to be transmitted to the decoder.

When dealing for example with residual prediction coefficients, the HEVC standard proposes an indicator called "cbf" (English abbreviation of "Coded Block Flag") that can take:
- either the value 0 which is representative of zero residual coefficients for the current block to be coded,
- or the value 1 which is representative of at least one non-zero residual coefficient for the current block to be coded.

Once the coded data signal has been received by the decoder, the decoding is done image by image, and for each image, block by block. For each block, the bits representative of the image parameters associated with the block are read, and then decoded with the aid of a decoding scheme implemented by a decoder.

The drawback of such an image parameter coding technique is that the resulting binary sequence remains expensive to signal. Thus, it does not make it possible to optimize the reduction in the gain from compression of the coded data. This results in unsatisfactory compression performance.

However, in certain image coding contexts, and for certain image types considered, it turns out that the coding of such parameters does not always turn out to be useful or else turns out to be somewhat ineffective, thus engendering, according to the context, either poor quality image reconstruction, or significant recourse to the calculational resources either at the coder, or at the decoder, or an overly high limitation of the gain in bitrate. For example, in medical imaging, it is not necessarily useful to code one or more coding parameters associated with blocks of the image that are situated at the periphery of the latter. According to another example, in the case of an image obtained by two-dimensional projection of a 360° video, whether this projection is of the Mercator type, equirectangular type, of the CMP (English abbreviation of "Cube Map Projection") type, etc . . . , it is known to note that such a projection engenders deformations in certain very particular zones of the projected image. For example, as regards an image projected onto a rectangle, it is known in advance that the upper and lower zones of this image contain the most deformations than the remainder of the image. It follows from this that the coding of the parameters associated with the blocks contained in these particular zones is not efficient, additionally engendering a pointless decrease in bitrate gain.

The invention is therefore aimed at optimizing the cost of signaling of the image coding parameters, by implementing a selective coding of these coding parameters which takes account, at a first level, of the characteristic of the image to be coded, and at a second level, of the disposition of the current block to be coded in this image.

SUBJECT AND SUMMARY OF THE INVENTION

One of the aims of the invention is to remedy drawbacks of the aforementioned prior art.

To this effect, a subject of the present invention relates to a method for coding at least one image split into blocks, implementing the following:
- code a first syntax element associated with a characteristic of said at least one image,
- for a current block to be coded associated with at least one coding parameter, code the data of the current block.

Such a coding method is noteworthy in that:
- if the first syntax element is coded according to a first predefined value representative of the characteristic of the image, a second syntax element representative of the value of said at least one coding parameter is coded only if the current block belongs to a predefined zone of the image, if the first syntax element is coded according to a second predefined value representative of the characteristic of the image, the second syntax element is coded, whether or not the current block belongs to the predefined zone.

Such a provision makes it possible to avoid coding, and then transmitting to the decoder, at least one syntax element representative of a coding parameter of a block, by taking account not only of the fact that such a block is situated in a specific zone of the image, for which the coding of this syntax element is not useful having regard to the current image coding context, but also of a characteristic of the image to be coded in which the current block is situated.

This therefore results in a non-negligible decrease in the signaling cost, to the extent that such a provision is reproducible at the level of the decoder.

According to a particular embodiment, if the current block belongs to the predefined zone of the image, the coding of the second syntax element representative of the value of said at least one coding parameter is implemented as a function of a criterion dependent on the characteristics of the current block.

Such a provision makes it possible furthermore to implement an adaptive coding of at least one syntax element representative of a coding parameter of a block, according to the value of a criterion dependent on the characteristics of the current block, such as for example the size, the value of the residual pixels of this block, the type of transform applied to the residual pixels of this block if the latter has undergone a prediction, etc. . . . .

Thus, as a function of the value of this criterion, it is decided to code or to not code this syntax element.

This results in a reduction in the cost of signaling which is optimized, through better adaptation of the coding to the local characteristics of the video signal.

According to another particular embodiment, the characteristic of said at least one image is the type of obtaining of said at least one image.

Such a provision makes it possible to reduce the cost of signaling in a selective manner according to the way in which the scene that the image represents was captured initially.

For example, if the current image is a two-dimensional image, it is decided:

to not code a syntax element representative of a coding parameter of a block of this image, in the case where the latter was obtained by projection of a video captured according to a plurality of viewing angles covering for example an angle of 360° and therefore comprises zones where it is known in advance that the information density per pixel is lower than in other zones of the image, to systematically code a syntax element representative of a coding parameter of a block of this image, in the case where the latter originates from a video comprising 2D images following one another temporally.

According to yet another particular embodiment, the characteristic of said at least one image is the current coding context of the image.

Such a provision makes it possible to reduce the cost of signaling in a selective manner within the framework of certain image coding applications.

According to an exemplary image coding context, in the case of image coding applied to medical imaging, it is decided to apply a coding level of different quality to at least two different zones of the current image in such a way as to:

not code a syntax element representative of a coding parameter of a block of this image, in the case where this block is located at the periphery of the image, code a syntax element representative of a coding parameter of a block of this image, in the case where this block is located at the center of the image.

According to another exemplary coding context, in the case of image coding applied to a televisual stream, it is decided to apply one and the same level of coding quality to each zone of the current image.

The various aforementioned modes or characteristics of embodiment may be added independently or in combination with one another, to the operations implemented in the course of the coding method such as is defined hereinabove.

Correlatively, the invention relates to a device for coding at least one image split into blocks, comprising a processing circuit which is designed to:

code a first syntax element associated with a characteristic of said at least one image, for a current block to be coded associated with at least one coding parameter, code the data of the current block.

Such a coding device is characterized in that the processing circuit is designed to:

if the first syntax element is coded according to a first predefined value representative of the characteristic of the image, code a second syntax element representative of the value of said at least one coding parameter, only if the current block belongs to a predefined zone of the image, if the first syntax element is coded according to a second predefined value representative of the characteristic of the image, code the second syntax element, whether or not the current block belongs to the predefined zone.

In a corresponding manner, the invention also relates to a method for decoding a data signal representative of at least one coded image having been split into blocks, implementing the following:

decode a first syntax element contained in said data signal, said first syntax element being associated with a characteristic of said at least one image, for a current block to be decoded associated with at least one coding parameter, decode the data of the current block.

Such a decoding method is noteworthy in that:

if the first syntax element has a first predefined value representative of the characteristic of the image, a second syntax element representative of the value of said at least one coding parameter is decoded only if the current block belongs to a predefined zone of the image, if the first syntax element has a second predefined value representative of the characteristic of the image, the second syntax element is decoded, whether or not the current block belongs to the predefined zone.

According to a particular embodiment, if the current block belongs to the predefined zone of the image, the decoding of the second syntax element representative of the value of said at least one coding parameter is implemented as a function of a criterion dependent on the characteristics of the current block.

According to another particular embodiment, the characteristic of said at least one image is the type of obtaining of said at least one image.

According to yet another particular embodiment, the characteristic of said at least one image is the current decoding context of the image.

The various aforementioned modes or characteristics of embodiment may be added independently or in combination with one another, to the operations implemented in the course of the decoding method such as is defined hereinabove.

Correlatively, the invention relates to a device for decoding a data signal representative of at least one coded image having been split into blocks, comprising a processing circuit which is designed to:

decode a first syntax element contained in the data signal, the first syntax element being associated with a characteristic of said at least one image, for a current block to be decoded associated with at least one coding parameter, decode the data of the current block.

Such a decoding device is noteworthy in that the processing circuit is designed to:

if the first syntax element has a first predefined value representative of the characteristic of the image, decode a second syntax element representative of the value of said at least one coding parameter, only if the current block belongs to a predefined zone of the image, if the first syntax element has a second predefined value representative of the characteristic of the image, decode the second syntax element, whether or not the current block belongs to the predefined zone.

The invention further relates to a computer program comprising instructions for implementing one of the coding and decoding methods according to the invention, when it is executed on a computer.

Such a program may use any programming language, and be in the form of source code, object code, or of code intermediate between source code and object code, such as in a partially compiled form, or in any other desirable form.

Yet another subject of the invention is also aimed at a recording medium readable by a computer, and comprising computer program instructions such as is mentioned hereinabove.

The recording medium may be any entity or device capable of storing the program. For example, the medium may comprise a storage means, such as a ROM, for example a CD ROM or a microelectronic circuit ROM, a USB key, or else a magnetic recording means, for example a hard disk.

Moreover, such a recording medium may be a transmissible medium such as an electrical or optical signal, which may be conveyed via an electrical or optical cable, by radio or by other means. The program according to the invention may be in particular downloaded over a network of Internet type.

Alternatively, such a recording medium may be an integrated circuit in which the program is incorporated, the circuit being adapted to execute the method in question or to be used in the execution of the latter.

BRIEF DESCRIPTION OF THE DRAWINGS

Other characteristics and advantages will become apparent on reading preferred embodiments described with reference to the figures in which.

DETAILED DESCRIPTION OF THE CODING PART

An embodiment of the invention will now be described, in which the coding method according to the invention is used to code an image or a sequence of images according to a binary stream close to that obtained by a coding implemented in a coder in accordance with any one of the current or forthcoming video coding standards.

In this embodiment, the coding method according to the invention is for example implemented in a software or hardware manner by modifications of such a coder. The coding method according to the invention is represented in the form of an algorithm comprising operations C1 to C9 such as are represented in FIG. 1A.

Figure 2:
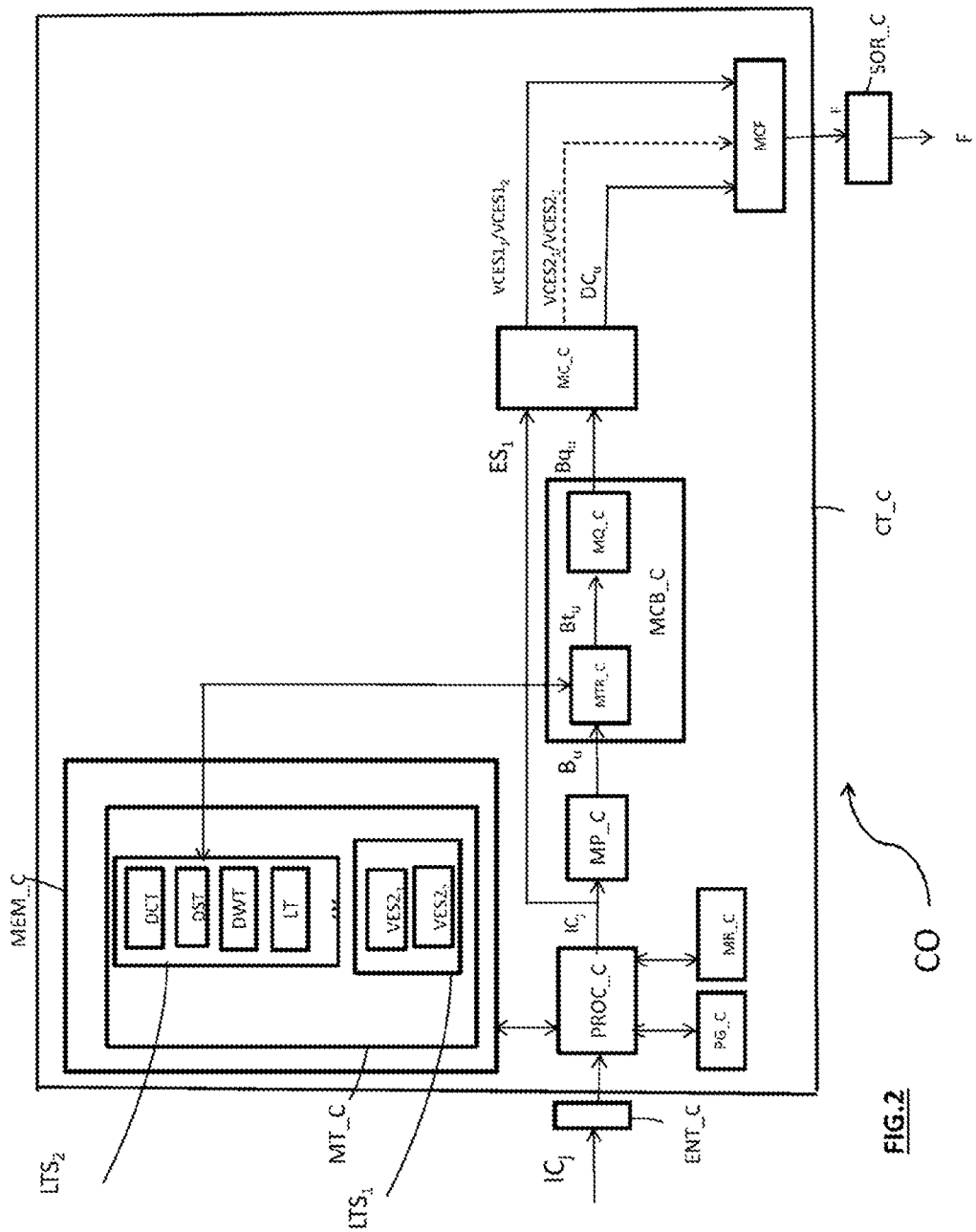
FIG. 2 represents a coding device according to one embodiment of the invention.

According to the embodiment of the invention, the coding method according to the invention is implemented in a coding device or coder CO represented in FIG. 2.

As illustrated in FIG. 2, the coder CO comprises a memory MEM_C comprising a buffer memory MT_C, a processor PROC_C driven by a computer program PG_C which implements the coding method according to the invention. On initialization, the code instructions of the computer program PG_C are for example loaded into a RAM memory, denoted MR_C, before being executed by the processor PROC_C.

Figure 1A:
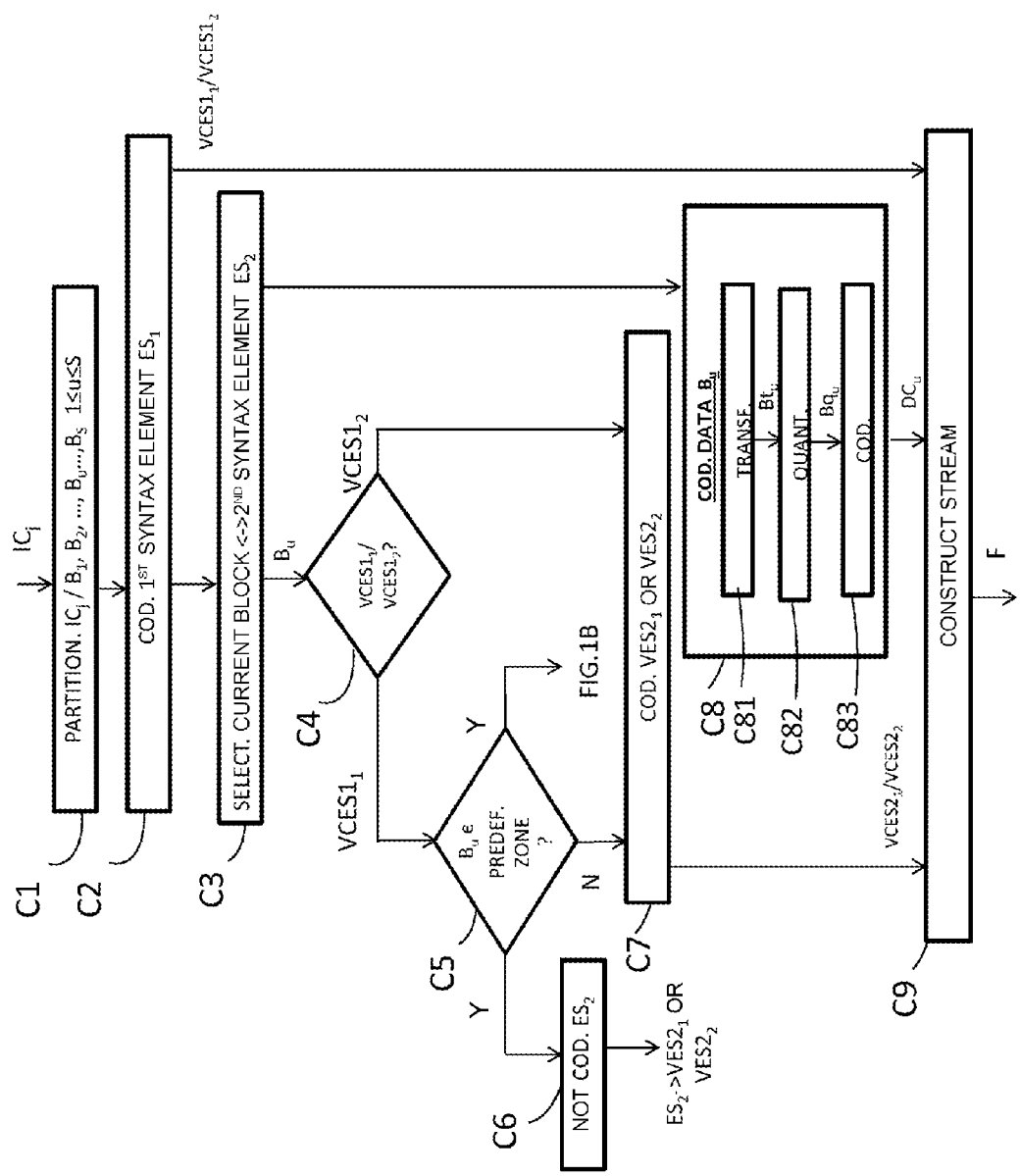
FIG. 1A represents the steps of the coding method according to one embodiment of the invention.

The coding method represented in FIG. 1A applies to any current image $IC_j$ which is fixed or else forms part of a sequence of L images $IC_1, \ldots, IC_j, \ldots, IC_L$ ($1 \leq j \leq L$) to be coded.

The current image $IC_j$ arises from at least one video sequence comprising, by way of non-exhaustive examples:

images arising from one and the same camera and following one another temporally (coding/decoding of 2D type), images arising from various cameras oriented according to different views (coding/decoding of 3D type), corresponding components of texture and depth, that is to say representative of one and the same scene (coding/decoding of 3D type), images obtained by projection of a 360° video, etc . . .

With reference to FIG. 1A, there is undertaken at C1, in a manner known per se, the splitting of a current image $IC_j$ into a plurality of blocks $B_1, B_2, \ldots, B_u, \ldots, B_S$ ($1 \leq u \leq S$). The partitioning is implemented by a partitioning device MP_C represented in FIG. 2, which device is driven by the processor PROC_C.

It should be noted that within the meaning of the invention, the term "block" signifies coding unit. The latter terminology is in particular used in the HEVC standard "ISO/IEC/23008-2 Recommendation ITU-T H.265 High Efficiency Video Coding (HEVC)".

In particular, such a coding unit groups together sets of pixels of rectangular or square shape, also called blocks, macroblocks, or else sets of pixels exhibiting other geometric shapes.

Said blocks $B_1, B_2, \ldots, B_u, \ldots, B_S$ are intended to be coded according to a predetermined order of traversal, which is for example of the lexicographic type. This signifies that the blocks are coded one after another, from left to right.

Other types of traversal are of course possible. Thus, it is possible to split the image $IC_j$ into several sub-images called slices and to apply a splitting of this type to each sub-image independently. It is also possible to code not a succession of rows, as explained hereinabove, but a succession of columns. It is also possible to traverse the rows or columns in one or the opposite direction.

Figure 3B:
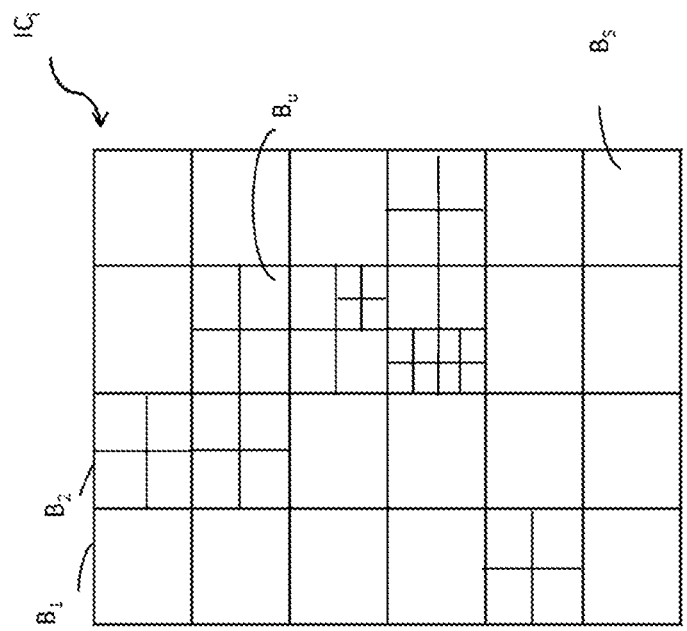
FIG. 3B represents an image split into blocks according to a second embodiment, FIGS. 4A to 4D each represent examples of zones predefined in the current image, in the case of a particular obtaining of the current image.
Figure 3A:
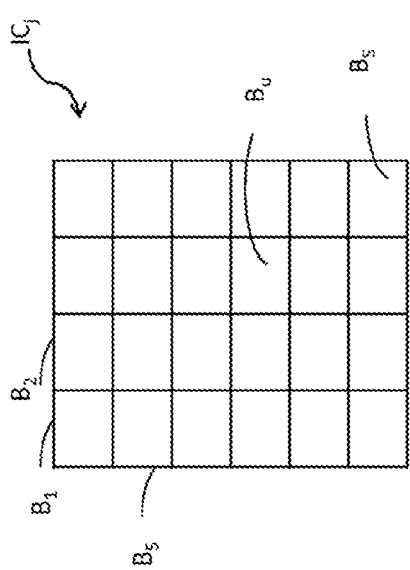
FIG. 3A represents an image split into blocks according to a first embodiment.

According to an example, the blocks $B_1, B_2, \ldots, B_u, \ldots, B_S$ have a square shape and all contain K pixels, with $K \geq 1$. According to a first embodiment represented in FIG. 3A, the blocks $B_1, B_2, \ldots, B_u, \ldots, B_S$ are obtained on completion of a single subdivision of the current image $IC_j$ into blocks of maximum size. According to this first embodiment, the blocks have a size of for example 64×64 pixels. According to a second embodiment represented in FIG. 3B, the blocks $B_1, B_2, \ldots, B_u, \ldots, B_S$ are obtained on completion of a subdivision of the current image $IC_j$ into blocks of size less than or equal to the aforementioned maximum size. According to this second embodiment, said blocks are for example of size 64×64 and/or 32×32 and/or 16×16 and/or 8×8 pixels.

As a function of the size of the image which is not necessarily a multiple of the size of the blocks, the last blocks on the left and the last blocks at the bottom might not be square. In an alternative embodiment, the blocks may be for example of rectangular size and/or not be aligned with one another.

At C2, there is undertaken the coding of a first syntax element $ES_1$ which is associated with a characteristic of the current image $IC_j$.

The syntax element $ES_1$ is a high-level syntax element of a video sequence comprising the current image $IC_j$. To this effect, as a function of the coding context, this element may be coded:
at the start of the coding of each image of the video sequence,
or just once at the start of the coding of a sequence of images,
or just once at the start of the coding of the video sequence.

The syntax element $ES_1$ is coded at C2:
by a first predefined value $VCES1_1$ which is representative of a characteristic of a first type of the current image $IC_j$,
by a second predefined value $VCES1_2$ which is representative of a characteristic of a second type of the current image $IC_j$. According to an example, $VCES1_1=1$ and $VCES1_2=0$.

The coding C2 is for example an entropy coding of CABAC ("Context Adaptive Binary Arithmetic Coder" in English) type or else an entropy coding of arithmetical or Huffman type. This coding is implemented by a coding device MC_C represented in FIG. 2, which device is driven by the processor PROC_C.

According to a first embodiment, the characteristic of the image $IC_j$ is the type of obtaining of the latter. To this effect:
if the image $IC_j$ is for example a 2D image which was obtained by two-dimensional projection of a conventional 360° video, $VCES1_1=1$,
if the image $IC_j$ is for example a conventional 2D image of fixed type or forming part of a sequence of images following one another temporally, $VCES1_2=0$.

According to a second embodiment, the characteristic of the image $IC_j$ is the choice at the coder of whether or not to apply a different level of coding quality to at least two zones of the current image to be coded. To this effect:
if the current image $IC_j$ is coded according to a first coding context, such as for example a medical imaging context, $VCES1_1=1$, thus indicating that the central zone of the current image is coded according to a greater level of quality than that applied to the peripheral zone of the current image,
if the current image $IC_j$ is coded according to a second coding context, such as for example a televisual context, $VCES1_2=0$, thus indicating that one and the same level of coding quality is applied to the whole current image.

With reference to FIG. 1A, at C3, the coder CO of FIG. 2 selects as current block a first block to be coded $B_u$ of the image $IC_j$, such as for example the first block $B_1$. The current block $B_u$ is associated with at least one coding parameter. By way of non-exhaustive examples, such a coding parameter is:
the mode of prediction (intra prediction, inter prediction, bi-prediction, default prediction carrying out a prediction for which no information is transmitted to the decoder (in English "skip");
the type of prediction (orientation, reference image component, . . . );
the type of subdivision into sub-blocks;
the type of transform, for example 4×4 DCT, 8×8 DCT, applied to the current block or to the residual pixels of the current block if the latter has undergone a prediction;
the pixel values;
the values of residual pixels resulting from a prediction;
a filtering of the current image $IC_j$ once coded, such as for example that achieved by the "Sample Adaptive Offset" technique of the HEVC standard (technique described in the document Chih-Ming Fu; E. Alshina; A. Alshin; Yu-Wen Huang; Ching-Yeh Chen; Chia-Yang Tsai; Chih-Wei Hsu; Shaw-Min Lei; Jeong-Hoon Park; Woo-Jin Han "*Sample Adaptive Offset in the HEVC Standard*" Published in: IEEE Transactions on Circuits and Systems for Video Technology (Volume: 22, Issue: 12, December 2012);
the index of the intra prediction mode from among a list constructed for the current block;
the index of the motion vector from among a list constructed for the current block;
an indicator of subdivision of the residual block obtained in case of prediction of the current block;
an indicator of filtering of the reference pixels that have served to predict the current block;
etc . . .

A second syntax element $ES_2$ is representative of the value of said at least one coding parameter.

At C4, the coder CO reads the coded value $VCES1_1$ or $VCES1_2$ of the syntax element $ES_1$.

If at C4, the coded value of the syntax element $ES_1$ is $VCES1_1$ and if, at C5, the current block $B_u$ belongs to a predefined zone of the current image $IC_j$, it is decided at C6 not to code the syntax element $ES_2$. To this effect, the syntax element $ES_2$ is set to a predefined value. Such an operation is particularly suitable when the information density of the predefined zone of the image is low or very low.

According to a first embodiment, if the syntax element $ES_2$ is representative of the mode of prediction of the current block $B_u$ and if, for example, $ES_2$ takes:
  a first predefined value $VES2_1$ indicating an inter prediction of the current block $B_u$,
  or a second predefined value $VES2_2$ indicating an intra prediction of the current block $B_u$,
it is decided at C6 to assign $ES_2$ to, for example, the first predefined value $VES2_1$ according to a convention predetermined at the coder CO.

According to a second embodiment, if the syntax element $ES_2$ is representative of the value of the residual pixels of the current block $B_u$ and if, for example, $ES_2$ takes:
  a first predefined value $VES2_1$ indicating residual pixels of zero value of the current block $B_u$,
  or a second predefined value $VES2_2$ indicating residual pixels of non-zero value of the current block $B_u$,
it is decided at C6 to assign $ES_2$ to, for example, the first predefined value $VES2_1$ according to a convention predetermined at the coder CO.

The predefined values $VES2_1$ and $VES2_2$ of the second syntax element $ES_2$ are stored beforehand in a list $LTS_1$ which is recorded in the buffer memory MT_C of the coder CO of FIG. 2.

During the coding of the current block $B_u$, only the first or the second embodiment of the syntax element $ES_2$ is implemented. By way of alternative, the first and second embodiments are implemented.

If at C4, the coded value of the syntax element $ES_1$ is $VCES1_1$ and if, at C5, the current block $B_u$ does not belong to the predefined zone of the current image, the predefined value $VES2_1$ or $VES2_2$ taken by the second syntax element $ES_2$ is coded at C7. On completion of this coding C7, as a function of the current coding context, a coded value $VCES2_1$ or $VCES2_2$ of the second syntax element $ES_2$ is obtained. By way of non-exhaustive example, $VCES2_1=0$ and $VCES2_2=1$.

According to a first embodiment, if the syntax element $ES_2$ is representative of the mode of prediction of the current block $B_u$ and if, for example, $ES_2$ takes:
  a first predefined value $VES2_1$ indicating an inter prediction of the current block $B_u$,
  or a second predefined value $VES2_2$ indicating an intra prediction of the current block $B_u$,
the value $VES2_1$ or $VES2_2$ is coded as for example the value $VCES2_1=0$ or $VCES2_2=1$, respectively, as a function of the current coding context.

According to a second embodiment, if the syntax element $ES_2$ is representative of the value of the residual pixels of the current block $B_u$ and if, for example, $ES_2$ takes:
  a first predefined value $VES2_1$ indicating residual pixels of zero value of the current block $B_u$,
  or a second predefined value $VES2_2$ indicating residual pixels of non-zero value of the current block $B_u$,
the value $VES2_1$ or $VES2_2$ of the syntax element $ES_2$ is systematically coded at C7, as for example the value $VCES2_1=0$ or $VCES2_2=1$, respectively, as a function of the current coding context.

Such a coding is for example an entropy coding of CABAC ("Context Adaptive Binary Arithmetic Coder" in English) type or else an entropy coding of arithmetical or Huffman type. This coding is implemented by a coding device MC_C represented in FIG. 2.

If at C4, the coded value of the syntax element $ES_1$ is $VCES1_2$, the value $VES2_1$ or $VES2_2$ of the syntax element $ES_2$ is systematically coded at C7, as for example the value $VCES2_1=0$ or $VCES2_2=1$, respectively, as a function of the current coding context.

According to one embodiment represented in FIG. 4A, for a current image $IC_j$ of height H, in the case where:
  the current image $IC_j$ is for example a 2D image obtained by two-dimensional projection of a 180° or 360° video, the syntax element $ES_1$ is coded according to the value $VCES1_1=1$,
  the current image $IC_k$ is for example a conventional 2D image of fixed type or forming part of a sequence of images following one another temporally, the syntax element $ES_1$ is coded according to the value $VCES1_2=0$.

Represented in FIG. 4A is the current image $IC_k$ in the guise of 2D image obtained by two-dimensional projection of a 360° video. A first predefined zone, denoted Z1, of the current image $IC_k$ has a height H1 such that $0.2\ H<H1<0.8\ H$. The blocks contained in the zone Z1 contain the pixels resulting from the projection into the current image $IC_k$ of the pixels closest to the equator of the image captured by a 360° video capture sphere and thus undergoing little deformation. The blocks contained in the remaining predefined zones of the image, denoted Z2 in FIG. 4A, contain the pixels resulting from the projection into the image $IC_j$ of the pixels situated near the poles of the 360° video capture sphere and thus undergoing maximum deformation.

Represented in FIG. 4B is the current image $IC_j$ in the guise of 2D image obtained by two-dimensional projection of a 180° video. The predefined zone Z1 of the current image $IC_j$ has a height H1 such that $0<H1<0.8\ H$. The blocks contained in the zone Z1 are the blocks containing the pixels resulting from the projection into the current image $IC_j$ of the pixels closest to the equator of the image captured by a 180° video capture hemisphere and thus undergoing little deformation. The blocks contained in the predefined zone Z2 of the image are the blocks containing the pixels resulting from the projection into the image $IC_j$ of the pixels situated near the North pole of the 180° video capture sphere and thus undergoing maximum deformation.

Represented in FIG. 4C is the current image $IC_j$ in the guise of 2D image obtained by two-dimensional projection of a 180° video. A first predefined zone Z1 of the current image $IC_j$ has a height H1 such that $0.2\ H<H1<H$. The blocks contained in the zone Z1 are the blocks containing the pixels resulting from the projection into the image $IC_j$ of the pixels closest to the equator of the image captured by a 180° video capture hemisphere and thus undergoing little deformation. The blocks contained in the remaining predefined zone Z2 of the current image $IC_j$ are the blocks containing the pixels resulting from the projection into the image $IC_j$ of the pixels situated near the South pole of the 180° video capture sphere and thus undergoing maximum deformation.

Represented in FIG. 4D is the current image $IC_j$ in the guise of 2D image obtained by two-dimensional projection of a 360° video. A predefined zone, denoted Z1, of the current image $IC_j$ has a height H1 such that 0.2 H<H1<0.8 H. The blocks contained in the zone Z1 are the blocks containing the pixels resulting from the projection into the current image $IC_j$ of the pixels closest to the equator of the image captured by a 360° video capture sphere and thus undergoing little deformation. The image $IC_j$ furthermore contains two other predefined zones Z2 situated on either side of the zone Z1. A first zone $Z2_1$ has a height $H2_1$ such that 0.1H<$H2_1$<0.2 H. The blocks contained in the zone $Z2_1$ of the current image $IC_j$ are the blocks containing the pixels resulting from the projection into the image $IC_j$ of the pixels situated nearest the last line before the South pole of the 360° video capture sphere and thus undergoing moderate deformation. A second zone $Z2_2$ has a height $H2_2$ such that 0.8 H<$H2_2$<0.9 H. The blocks contained in the zone $Z2_2$ of the current image $IC_j$ are the blocks containing the pixels resulting from the projection into the image $IC_j$ of the pixels situated nearest the first line before the North pole of the 360° video capture sphere and thus undergoing moderate deformation. The image $IC_j$ furthermore still contains two other predefined zones situated respectively on either side of the zones $Z2_1$ and $Z2_2$. A first zone $Z3_1$ has a height $H3_1$ such that 0<$H3_1$<0.1 H. The blocks contained in the zone $Z3_1$ of the current image $IC_j$ are the blocks containing the pixels resulting from the projection into the image $IC_j$ of the pixels situated nearest the South pole of the 360° video capture sphere and thus undergoing maximum deformation. A second zone $Z3_2$ has a height $H3_2$ such that 0.9 H<$H3_2$<H. The blocks contained in the zone $Z3_2$ of the current image $IC_j$ are the blocks containing the pixels resulting from the projection into the image $IC_j$ of the pixels situated nearest the North pole of the 360° video capture sphere and thus undergoing maximum deformation.

It is of course possible to define predefined zones of the current image $IC_j$ in a different manner. Thus, in the case where the current image $IC_j$ is for example a 2D image obtained by projection of CMP type of a 180° or 360° video, one or more specific zones will be predefined as a function of the proximity of the pixels with respect to the edges of the cubes that served for the projection. Alternatively, the zones will be able to be defined by the value of a function dependent on the coordinates of the block in the current image $IC_j$, or on its order of processing among all the blocks of the current image $IC_j$. Thus for example, it is possible to define a zone by the distance from the pixel situated at the center of the image: the pixels whose distance with respect to the center of the image is greater than a threshold define a first zone, the other pixels defining a second zone. Thus, in the case for example of FIG. 4A, if (xc; yc) are the coordinates of the pixel P×C situated at the center of the current image ICj, and (xp; yp) the coordinates of a given pixel P×D of the current block $B_u$, the given pixel P×D belongs to the first zone Z1 if and only if the square root of the value $(xc-xp)^2+(yc-yp)^2$ is greater than a threshold T1. Alternatively, the given pixel P×D belongs to the first zone Z1 if and only if one of the values |xc−xp| or |yc−yp| is greater than a threshold T2.

Figure 5A:
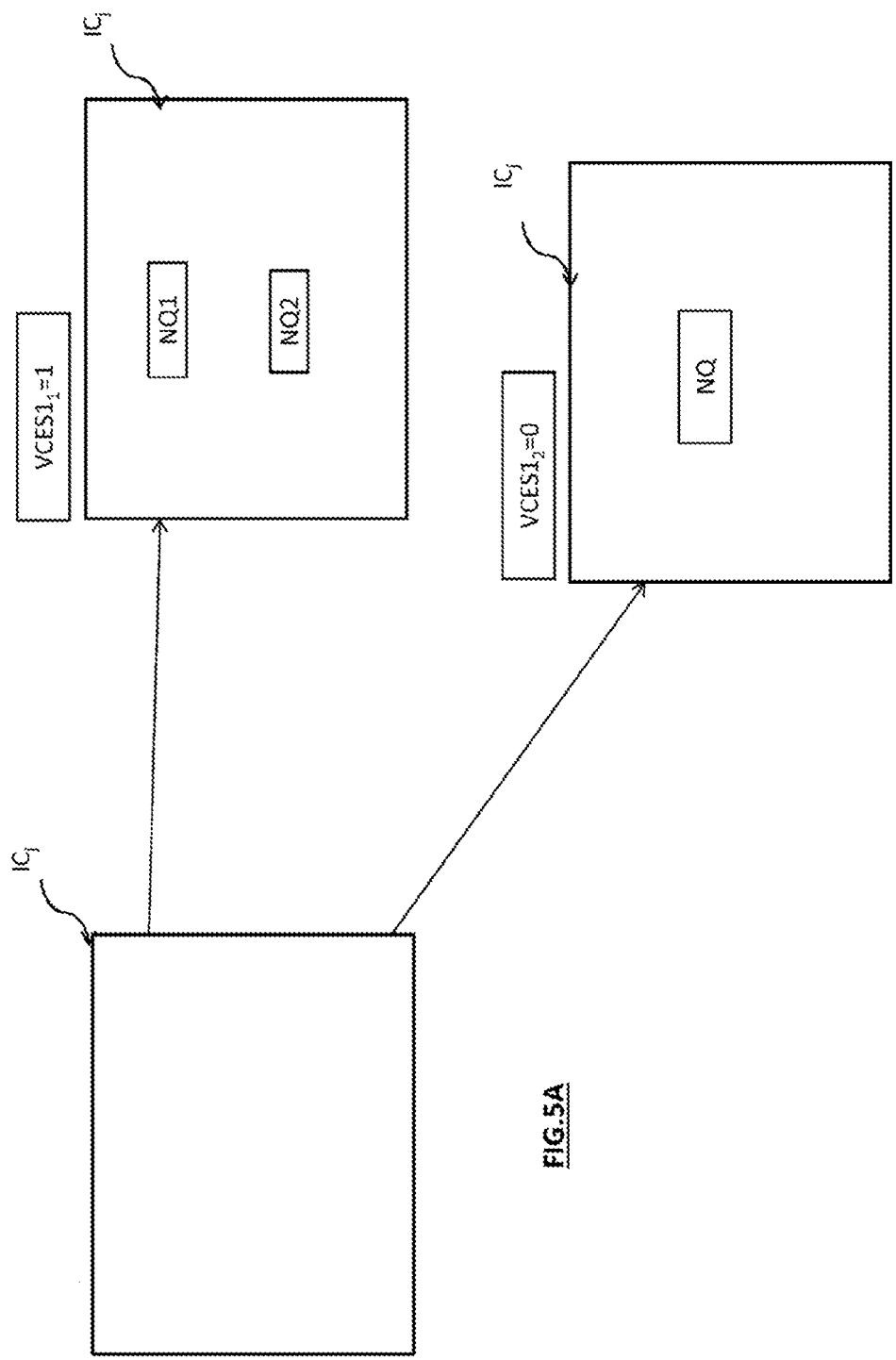
FIG. 5A represents a current image in a coding/decoding context where the coder/decoder chooses whether or not to apply a different level of coding/decoding quality to at least two zones of the current image.

FIG. 5A represents an exemplary current image $IC_j$, for which the characteristic of the image $IC_j$ is the choice at the coder of whether or not to apply a different level of coding quality to at least two zones of the current image.

To this effect:
  if the current image $IC_j$ is coded according to a first coding context, such as for example a medical imaging context, $VCES1_1$=1 to indicate that a first zone of the current image is coded according to a lower level of coding quality NQ1 than a level of coding quality NQ2 applied to a second zone of the current image,
  if the current image $IC_j$ is coded according to a second coding context, such as for example a televisual context, $VCES1_2$=0 to indicate that one and the same level of coding quality NQ is applied to any zone of the current image.

Figure 5B:
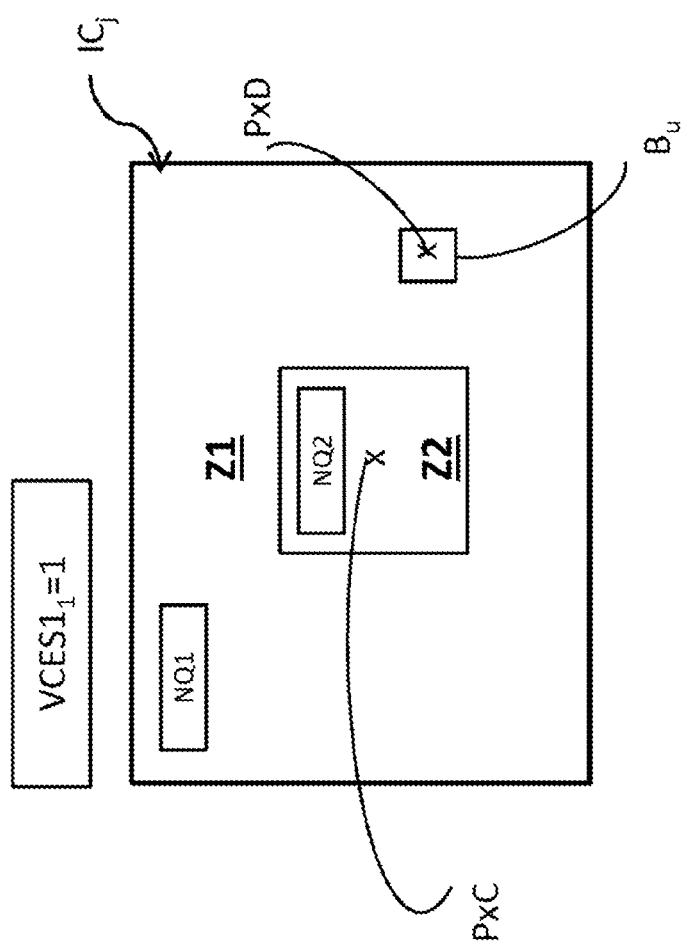
FIG. 5B represents an exemplary zone predefined in the current image, in the case where the coder/decoder chooses whether or not to apply a different level of coding/decoding quality to at least two zones of the current image.

Represented in FIG. 5B is an example of zones predefined in the current image $IC_j$. In this example, the current image $IC_j$ comprises:
  a first predefined zone Z1, such as for example the peripheral zone of the current image $IC_j$, whose information density is low and for which the level of coding quality NQ1 is applied,
  at least one second predefined zone Z2, such as for example the central zone of the current image $IC_j$, whose information density is higher and for which the level of coding quality NQ2 is applied.

In a manner similar to the examples given with reference to FIGS. 4A to 4D, it is of course possible to define predefined zones of the current image $IC_j$ in a different manner. Thus, for example, if (xc; yc) are the coordinates of the pixel P×C situated at the center of the image, and (xp; yp) the coordinates of a given pixel P×D of the current block $B_u$, the given pixel belongs to the first zone Z1 if and only if one of the values |xc−xp| or |yc−yp| is greater than a threshold T3, where T3 equals a sixth of the width in terms of number of pixels, of the current image $IC_j$.

Again with reference to FIG. 1A, the data of the current block $B_u$ are coded at C8.

According to a nonlimiting exemplary embodiment, such a coding C8 implements the application C81 of a transform to the data of the current block $B_u$.

In the example described here, by data is meant the pixels of the current block $B_u$.

It should however be noted that by data is also meant the pixels of a predicted block obtained with the aid of a prediction of the current block $B_u$ with respect to a predictor block which is selected subsequent to a competition between various predetermined modes of prediction, inter, intra or others, for example by minimization of a distortion bitrate criterion well known to the person skilled in the art.

In a manner known per se, as a function of the context or of the coding standard used, such a transform is for example a transform of DCT (English abbreviation of "Discrete Cosine Transform") type, DST (English abbreviation of "Discrete Sine Transform") type, of DWT (English abbreviation of "Discrete Wavelet Transform") type or else of LT (English abbreviation of "Lapped Transform") type. These transforms are stored beforehand in a list $LTS_2$, in the buffer memory MT_C of the coder CO of FIG. 2.

On completion of the application of this transform, a current transformed data block $Bt_u$ is obtained.

Such an operation is performed by a transform calculation device MTR_C, such as represented in FIG. 2, which device is driven by the processor PROC_C.

The coding C8 furthermore implements a quantization C82 of the data of the transformed block $Bt_u$ according to a conventional quantization operation, such as for example a scalar or vector quantization. A block $Bq_u$ of quantized coefficients is then obtained.

The quantization C82 is implemented by a quantization device MQ_C such as represented in FIG. 2, which device is driven by the processor PROC_C.

The transform calculation device MTR_C and the quantization device MQ_C are contained in a block coding device MCB_C represented in FIG. 2, which device is driven by the processor PROC_C.

The coding C8 furthermore implements a coding C83 of the data of the block $Bq_u$ of quantized coefficients. The coding C83 is implemented by the coding device MC_C of FIG. 2. On completion of the coding C83, a set of coded data $DC_u$ of the current block $B_u$ is obtained.

With reference to FIG. 1A, there is undertaken at C9 the construction of a signal or data stream F which contains:
the coded data $DC_u$ obtained at C8,
the coded value $VCES1_1$ or $VCES1_2$ of the first syntax element $ES_1$,
optionally the coded value $VCES2_1$ or $VCES2_2$ of the second syntax element(s) $ES_2$ according to the predefined zone of the current image $IC_j$ in which the current block $B_u$ is situated.

The stream construction C9 is implemented by a data signal construction device MCF, such as represented in FIG. 2.

The data signal F is thereafter transmitted by a communication network (not represented) to a remote terminal. The latter comprises the decoder DO represented in FIG. 7.

In a manner known per se, the data signal F can furthermore comprise certain information encoded by the coder CO, such as for example:
the type of prediction (Inter, Intra or others) if the current block $B_u$ has been predicted, and if relevant, the prediction mode selected, the index of the predictor block obtained,
the type of partitioning of the current block $B_u$ if the latter has been partitioned,
the type of transform applied to the data of the current block $B_u$,
etc . . . .

By way of alternative, the choice to code or not to code said aforementioned certain information is implemented according to the invention, by application of operation C4 of FIG. 1A.

In a manner known per se, there is thereafter undertaken the decoding (not represented) of the coded data $DC_u$ obtained at C8. A current decoded block $BD_u$ is then reconstructed, such a reconstructed block being the same as the decoded block obtained on completion of the method, which will be described further on in the description, for decoding the image $IC_j$. The decoded block $BD_u$ is thus rendered available to be used by the coder CO of FIG. 2.

The coding operations C1 to C9 which have just been described hereinabove are thereafter implemented for each of the blocks $B_1, B_2, \ldots, B_u, \ldots, B_S$ to be coded of the current image $IC_j$ considered.

A variant of the coding method of FIG. 1A will now be described with reference to FIG. 1B.

This variant differs from the coding method of FIG. 1A only through the fact that:
the coding C7 of the value $VES2_1$ or $VES2_2$ of the second syntax element $ES_2$ is not systematically implemented,
the value $VES2_1$ or $VES2_2$ of the second syntax element $ES_2$ may be coded even if the current block $B_u$ belongs to the predefined zone of the current image $IC_j$.

Figure 1B:
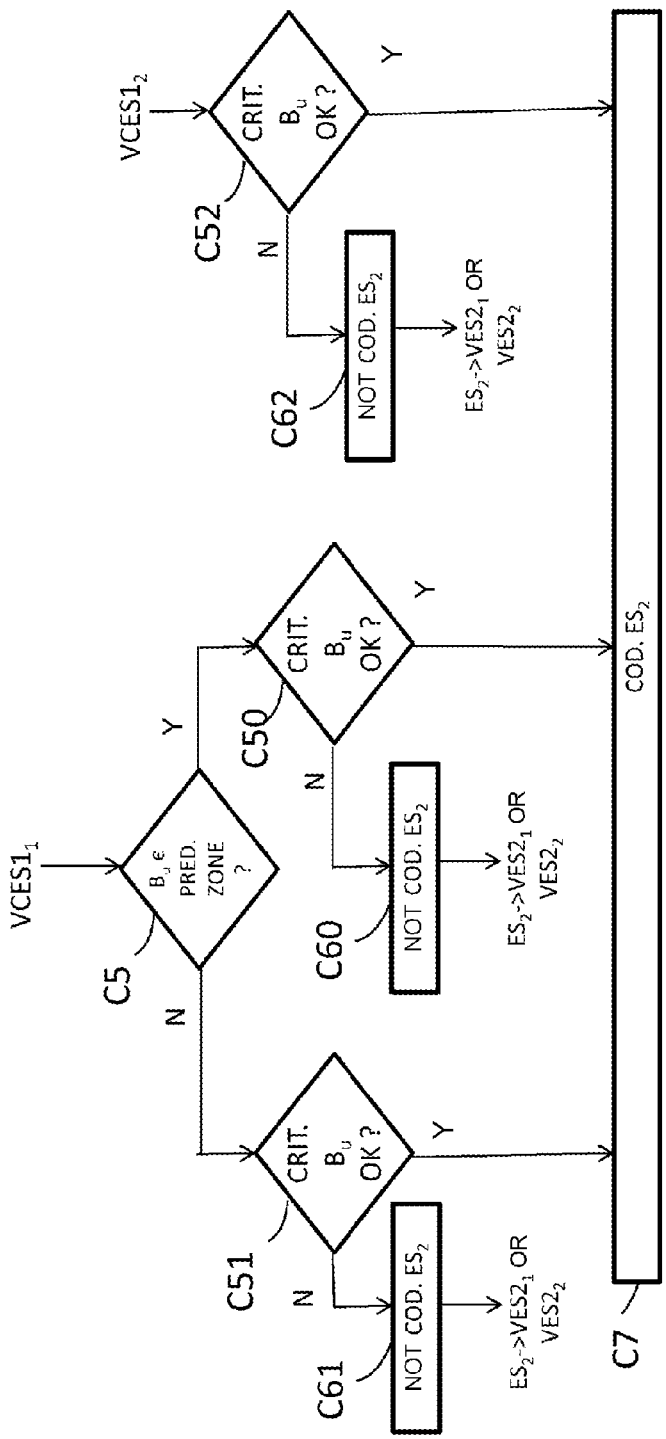
FIG. 1B represents an alternative of the coding method of FIG. 1A.

To this effect, as represented in FIG. 1B, in the case where the current block $B_u$ belongs to the predefined zone of the current image $IC_j$, a criterion dependent on the characteristics of the current block is examined at C50.

If the criterion is fulfilled, the value $VES2_1$ or $VES2_2$ of the second syntax element $ES_2$ is coded at C7.

If the criterion is not fulfilled, it is decided at C60 not to code the value $VES2_1$ or $VES2_2$ of the second syntax element $ES_2$. It is then decided at C60 to assign $ES_2$ to the first predefined value $VES2_1$ or to the second predefined value $VES2_2$ according to the current coding context.

In the case where the current block $B_u$ does not belong to the predefined zone of the current image $IC_j$, a criterion dependent on the characteristics of the current block is examined at C51.

If the criterion is fulfilled, the value $VES2_1$ or $VES2_2$ of the second syntax element $ES_2$ is coded at C7.

If the criterion is not fulfilled, it is decided at C61 not to code the second syntax element $ES_2$. It is then decided at C61 to assign $ES_2$ to the first predefined value $VES2_1$ or to the second predefined value $VES2_2$ according to the current coding context.

In the case where the coded value of the first syntax element $ES_1$ is $VCES1_2$, a criterion dependent on the characteristics of the current block is examined at C52.

If the criterion is fulfilled, the value $VES2_1$ or $VES2_2$ of the second syntax element $ES_2$ is coded at C7.

If the criterion is not fulfilled, it is decided at C62 not to code the second syntax element $ES_2$. It is then decided at C62 to assign $ES_2$ to the first predefined value $VES2_1$ or to the second predefined value $VES2_2$ according to the current coding context.

As a variant, just one or else two of the three operations C50, C51, C52 is implemented.

According to an exemplary criterion, in the case where the second syntax element $ES_2$ is representative of the size of the current block $B_u$, the value $VES2_1$ or $VES2_2$ of the syntax element $ES_2$ is compared with a predetermined size value VTP.

In the case for example of the current images represented in FIGS. 4A to 4C, for which the coded value $VCES1_1$ of the syntax element $ES_1$ indicates for example that the current image $IC_j$ is for example a 2D image obtained by two-dimensional projection of a 180° or 360° video:
if at C5 (FIG. 1B), the current block $B_u$ belongs to the predefined zone Z1, and
if at C50, it is determined as criterion that the size of the current block is greater than a predetermined value VTP, for example 32×32, the value $VES2_1$ or $VES2_2$ of the second syntax element $ES_2$ representative of the size of the current block $B_u$ is coded at C7,
otherwise, it is decided at C60 not to code the second syntax element $ES_2$, the latter being assigned to the first predefined value $VES2_1$ or to the second predefined value $VES2_2$ according to the current coding context,
if at C5 (FIG. 1B), the current block $B_u$ does not belong to the predefined zone Z1, stated otherwise belongs to the predefined zone Z2 of the current image $IC_j$, and
if at C51, it is determined as criterion that the size of the current block is greater than a predetermined value VTP, for example 16×16, the value $VES2_1$ or $VES2_2$ of the second syntax element $ES_2$ representative of the size of the current block $B_u$ is coded at C7,
otherwise, it is decided at C61 not to code the second syntax element $ES_2$, the latter being assigned to the first predefined value $VES2_1$ or to the second predefined value $VES2_2$ according to the current coding context.

In the case for example of a current image (not represented), for which the coded value $VCES1_2$ of the syntax element $ES_1$ indicates for example that the current image $IC_j$ is for example a conventional 2D image of fixed type or forming part of a sequence of images following one another temporally:

if at C52 (FIG. 1B), it is determined as criterion that the size of the current block is greater than a predetermined value VTP, for example 8×8, the value $VES2_1$ or $VES2_2$ of the second syntax element $ES_2$ representative of the size of the current block $B_u$ is coded at C7, otherwise, it is decided at C62 not to code the second syntax element $ES_2$, the latter being assigned to the first predefined value $VES2_1$ or to the second predefined value $VES2_2$ according to the current coding context.

In the case of the current image $IC_j$ represented in FIG. 4D, for which the coded value $VCES1_1$ of the syntax element $ES_1$ indicates for example that the current image $IC_j$ is for example a 2D image obtained by two-dimensional projection of a 360° video:

if at C5 (FIG. 1B), the current block $B_u$ belongs to the predefined zone Z1, and if at C50, it is determined as criterion that the size of the current block is greater than a predetermined value VTP, for example 32×32, the value $VES2_1$ or $VES2_2$ of the second syntax element $ES_2$ representative of the size of the current block $B_u$ is coded at C7, otherwise, it is decided at C60 not to code the second syntax element $ES_2$, the latter being assigned to the first predefined value $VES2_1$ or to the second predefined value $VES2_2$ according to the current coding context, if at C5 (FIG. 1B), the current block $B_u$ belongs to the predefined zone Z2, and if at C51, it is determined as criterion that the size of the current block is much greater than a predetermined value VTP, for example 16×16, the value $VES2_1$ or $VES2_2$ of the second syntax element $ES_2$ representative of the size of the current block $B_u$ is coded at C7, otherwise, it is decided at C61 not to code the second syntax element $ES_2$, the latter being assigned to the first predefined value $VES2_1$ or to the second predefined value $VES2_2$ according to the current coding context, if at C5 (FIG. 1B), the current block $B_u$ belongs to the predefined zone Z3, and if at C51, it is determined as criterion that the size of the current block is much greater than a predetermined value VTP, for example 8×8, the value $VES2_1$ or $VES2_2$ of the second syntax element $ES_2$ representative of the size of the current block $B_u$ is coded at C7, otherwise, it is decided at C61 not to code the second syntax element $ES_2$, the latter being assigned to the first predefined value $VES2_1$ or to the second predefined value $VES2_2$ according to the current coding context.

In the case for example of the current image $IC_j$ represented in FIG. 5B, for which the coded value $VCES1_1$ of the syntax element $ES_1$ indicates for example that at least two zones of the current image $IC_j$ are coded according to a different level of coding quality:

if at C5 (FIG. 1B), the current block $B_u$ belongs to the predefined zone Z1, and if at C50, it is determined as criterion that the size of the current block is greater than a predetermined value VTP, for example 32×32, the value $VES2_1$ or $VES2_2$ of the second syntax element $ES_2$ representative of the size of the current block $B_u$ is coded at C7, otherwise, it is decided at C60 not to code the second syntax element $ES_2$, the latter being assigned to the first predefined value $VES2_1$ or to the second predefined value $VES2_2$ according to the current coding context, if at C5 (FIG. 1B), the current block $B_u$ does not belong to the predefined zone Z1, stated otherwise belongs to the predefined zone Z2 of the current image $IC_j$, and if at C51, it is determined as criterion that the size of the current block is greater than a predetermined value VTP, for example 16×16, the value $VES2_1$ or $VES2_2$ of the second syntax element $ES_2$ representative of the size of the current block $B_u$ is coded at C7, otherwise, it is decided at C61 not to code the second syntax element $ES_2$, the latter being assigned to the first predefined value $VES2_1$ or to the second predefined value $VES2_2$ according to the current coding context.

In the case for example of the current image $IC_j$ represented at the bottom right in FIG. 5A, for which the coded value $VCES1_2$ of the syntax element $ES_1$ indicates for example that every zone of the current image $IC_j$ is coded according to one and the same level of coding quality:

if at C52 (FIG. 1B), it is determined as criterion that the size of the current block is greater than a predetermined value VTP, for example 8×8, the value $VES2_1$ or $VES2_2$ of the second syntax element $ES_2$ representative of the size of the current block $B_u$ is coded at C7, otherwise, it is decided at C62 not to code the second syntax element $ES_2$, the latter being assigned to the first predefined value $VES2_1$ or to the second predefined value $VES2_2$ according to the current coding context.

Detailed Description of the Decoding Part

An embodiment of the invention will now be described, in which the decoding method according to the invention is used to decode a signal or data stream which is representative of an image or of a sequence of images and which is able to be decoded by a decoder in accordance with any one of the current or forthcoming video decoding standards.

In this embodiment, the decoding method according to the invention is for example implemented in a software or hardware manner by modifications of such a decoder.

Figure 6A:
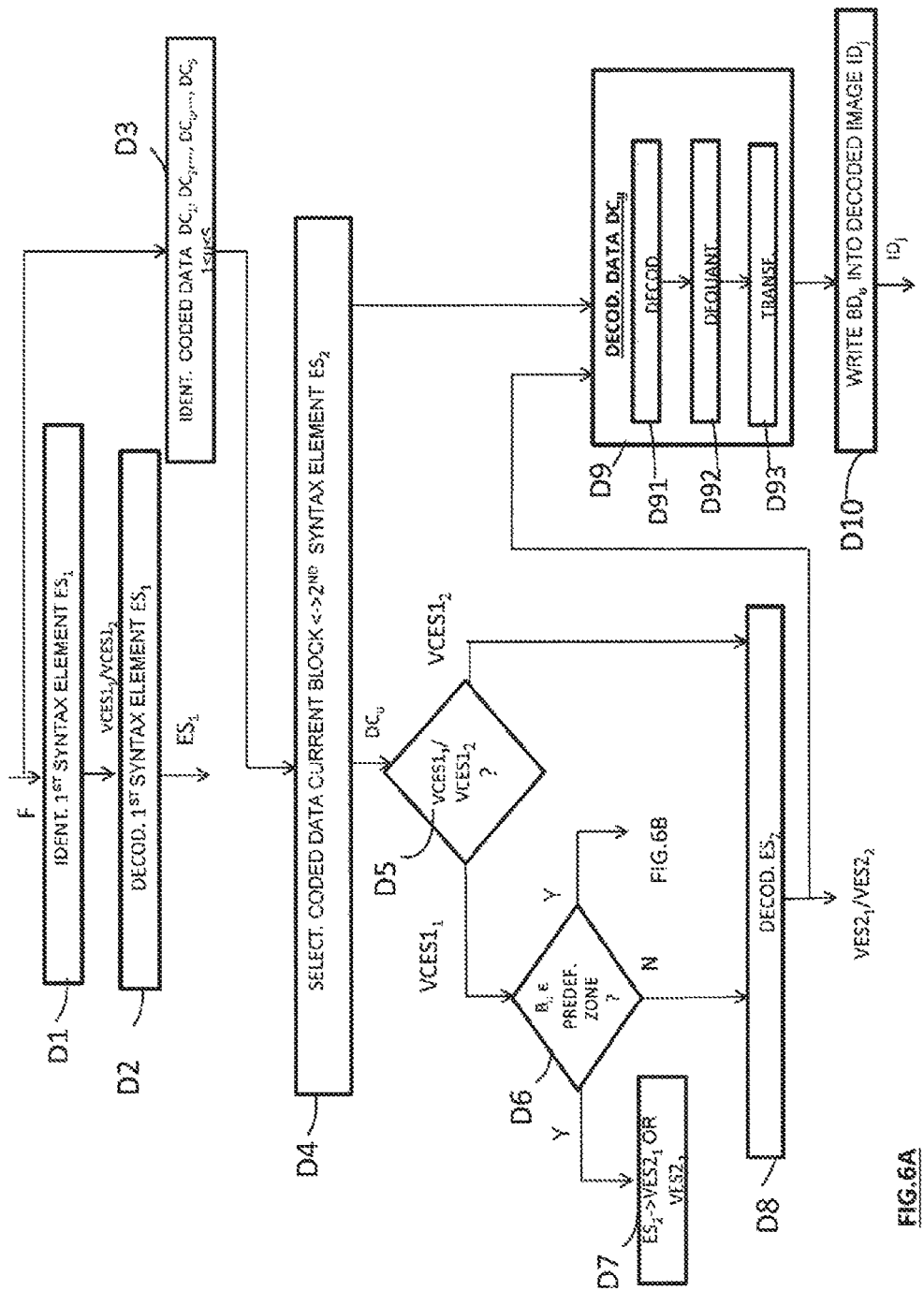
FIG. 6A represents the steps of the decoding method according to one embodiment of the invention.

The decoding method according to the invention is represented in the form of an algorithm comprising operations D1 to D10 such as are represented in FIG. 6A.

Figure 7:
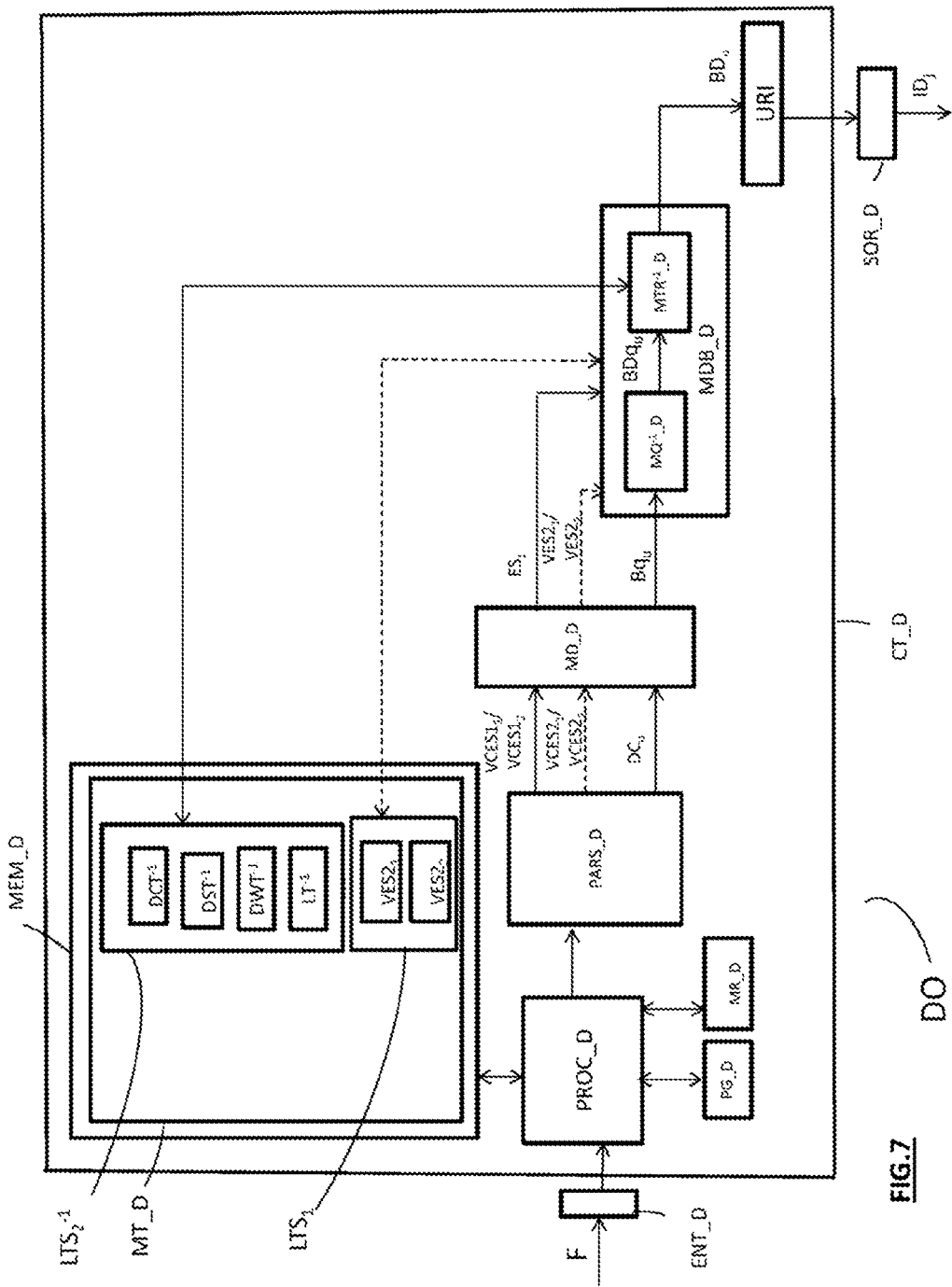
FIG. 7 represents a decoding device according to one embodiment of the invention.

According to this embodiment, the decoding method according to the invention is implemented in a decoding device or decoder DO represented in FIG. 7.

As illustrated in FIG. 7, according to this embodiment of the invention, the decoder DO comprises a memory MEM_D which itself comprises a buffer memory MT_D, a processor PROC_D driven by a computer program PG_D which implements the decoding method according to the invention. On initialization, the code instructions of the computer program PG_D are for example loaded into a RAM memory denoted RAM_D, before being executed by the processor PROC_D.

The decoding method represented in FIG. 6A applies to any coded current image $IC_j$ which is fixed or else forms part of a sequence of L images $IC_1, \ldots, IC_j, \ldots, IC_L$ ($1 \leq j \leq L$) to be decoded.

The current image $IC_j$ to be decoded arises from at least one video sequence comprising, by way of non-exhaustive examples:
- images arising from one and the same camera and following one another temporally (coding/decoding of 2D type),
- images arising from various cameras oriented according to different views (coding/decoding of 3D type),
- corresponding components of texture and depth, that is to say representative of one and the same scene (coding/decoding of 3D type),
- images obtained by projection of a 360° video,
- etc . . .

At D1, there is undertaken the identification, in the signal F, of the coded value $VCES1_1$ or $VCES1_2$ of a first syntax element $ES_1$ which is associated with a characteristic of the current image $IC_j$ to be decoded.

The syntax element $ES_1$ is a high-level syntax element of a video sequence comprising the current image $IC_j$ to be decoded. To this effect, as a function of the decoding context, this element may be decoded:
- at the start of the decoding of each image of the video sequence,
- or just once at the start of the decoding of a sequence of images,
- or just once at the start of the decoding of the video sequence.

Such an identification D1 is implemented by a stream analysis device PARS_D, such as represented in FIG. 7, said device being driven by the processor PROC_D.

At D2, the coded value $VCES1_1$ or $VCES1_2$ taken by the first syntax element $ES_1$ is decoded.

Such a decoding D2 is implemented by a decoding device MD_D represented in FIG. 7, which device is driven by the processor PROC_D.

The decoding is for example an entropy decoding of CABAC type or else an entropy decoding of arithmetical or Huffman type.

According to a first embodiment, the characteristic of the image $IC_j$ is the type of obtaining of the latter. To this effect:
- if the image $IC_j$ is for example a 2D image which was obtained by two-dimensional projection of a conventional 360° video, it is the coded value $VCES1_1$ of the syntax element $ES_1$ which is decoded,
- if the image $IC_j$ is for example a conventional 2D image of fixed type or forming part of a sequence of images following one another temporally, it is the coded value $VCES1_2$ of the syntax element $ES_1$ which is decoded.

According to a second embodiment, the characteristic of the image $IC_j$ is the choice at the decoder of whether or not to apply a different level of decoding quality to at least two zones of the current image.

To this effect:
- if the current image $IC_j$ is decoded according to a first decoding context, such as for example a medical imaging context, the coded value of the syntax element $ES_1$ identified at D1 in the signal F is $VCES1_1=1$ to indicate that a first zone of the current image must be decoded according to a lower level of quality NQ1 than a level of quality NQ2 applied to a second zone of the current image,
- if the current image $IC_j$ is decoded according to a second decoding context, such as for example a televisual context, the coded value of the syntax element $ES_1$ identified at D1 in the signal F is $VCES1_2=0$ to indicate that one and the same level of decoding quality NQ is applied to every zone of the current image $IC_j$.

With reference to FIG. 6A, there is undertaken at D3 the identification, in the signal F, of the coded data $DC_1$, $DC_2$, . . . , $DC_u$, $DC_S$ ($1 \leq u \leq S$) associated respectively with the blocks $B_1$, $B_2$, . . . , $B_u$, . . . , $B_S$ coded previously in accordance with the aforementioned lexicographic order, which were obtained on completion of the coding operation C8 of FIG. 1A. This signifies that the blocks are decoded one after another, from left to right.

Such an identification D3 is implemented by the stream analysis device PARS_D of FIG. 7.

Other types of traversal than that which has just been described hereinabove are of course possible and depend on the order of traversal chosen on coding.

According to an example, the blocks $B_1$, $B_2$, . . . , $B_u$, . . . , $B_S$ have a square shape and all contain K pixels, with $K \geq 1$. According to a first embodiment represented in FIG. 3A, the blocks $B_1$, $B_2$, . . . , $B_u$, . . . , $B_S$ are obtained on completion of a single subdivision of the current image $IC_j$ into blocks of maximum size. According to this first embodiment, the blocks have a size of for example 64×64 pixels. According to a second embodiment, the blocks $B_1$, $B_2$, . . . , $B_u$, . . . , $B_S$ are obtained on completion of a subdivision of the current image $IC_j$ into blocks of size less than or equal to the aforementioned maximum size. According to this second embodiment, said blocks are for example of size 64×64 and/or 32×32, and/or 16×16, and/or 8×8 pixels.

As a function of the size of the image which is not necessarily a multiple of the size of the blocks, the last blocks on the left and the last blocks at the bottom might not be square. In an alternative embodiment, the blocks may be for example of rectangular size and/or not be aligned with one another.

With reference to FIG. 6A, at D4, the decoder DO of FIG. 7 selects as current block to be decoded a first set of coded data $DC_u$ of the image $IC_j$, such as for example the first set of coded data DC, associated with the first block $B_1$ to be decoded. The set of coded data $DC_u$ of the current block $B_u$ is associated with at least one coding parameter. By way of non-exhaustive examples, such a coding parameter is:
- the mode of prediction (intra prediction, inter prediction, bi-prediction, default prediction carrying out a prediction for which no information is transmitted to the decoder (in English "skip");
- the type of prediction (orientation, reference image component, . . . );
- the type of subdivision into sub-blocks;
- the type of transform, for example 4×4 DCT, 8×8 DCT, applied to the current block or to the residual pixels of the current block if the latter has undergone a prediction;
- the pixel values;
- the values of residual pixels resulting from a prediction;
- a filtering of the current image $IC_j$ once coded, such as for example that achieved by the "Sample Adaptive Offset" technique of the HEVC standard (technique described in the document Chih-Ming Fu; E. Alshina; A. Alshin; Yu-Wen Huang; Ching-Yeh Chen; Chia-Yang Tsai; Chih-Wei Hsu; Shaw-Min Lei; Jeong-Hoon Park; Woo-Jin Han "*Sample Adaptive Offset in the HEVC Standard*" Published in: IEEE Transactions on Circuits and Systems for Video Technology (Volume: 22, Issue: 12, December 2012);
- the index of the intra prediction mode from among a list constructed for the current block;
- the index of the motion vector from among a list constructed for the current block;

an indicator of subdivision of the residual block obtained in case of prediction of the current block;

an indicator of filtering of the reference pixels which have served to predict the current block;

etc . . .

A second syntax element $ES_2$ is representative of the value of said at least one coding parameter.

At D5, the decoder DO reads whether one is dealing with the coded value $VCES1_1$ or $VCES1_2$ of the syntax element $ES_1$ which was decoded at D2.

If at D5, one is dealing with the coded value $VCES1_1$ of the first syntax element $ES_1$ and if, at D6, the coded data $DC_u$ are associated with a current block $B_u$ which belongs to a predefined zone of the current image $IC_j$, the syntax element $ES_2$ is set to a predefined value. Such an operation is particularly suitable when the information density of the predefined zone of the image is low or very low.

Examples of predefined zones of the current image, according to a first embodiment, have already been described with reference to FIGS. 4A to 4D and will therefore not be described again here.

Examples of predefined zones of the current image, according to a second embodiment, have already been described with reference to FIG. 5B and will therefore not be described again here.

According to a first embodiment, if the syntax element $ES_2$ is representative of the mode of prediction of the current block $B_u$ to be decoded and if, for example, $ES_2$ takes:

a first predefined value $VES2_1$ indicating an inter prediction of the current block $B_u$, or a second predefined value $VES2_2$ indicating an intra prediction of the current block $B_u$, it is decided at D7 to assign $ES_2$ to, for example, the first predefined value $VES2_1$ according to a convention predetermined at the decoder DO and which is the same as at the coder CO.

According to a second embodiment, if the syntax element $ES_2$ is representative of the value of the residual pixels of the current block $B_u$ and if, for example, $ES_2$ takes:

a first predefined value $VES2_1$ indicating residual pixels of zero value of the current block $B_u$, or a second predefined value $VES2_2$ indicating residual pixels of non-zero value of the current block $B_u$ to be decoded, it is decided at D7 to assign $ES_2$, for example to the first predefined value $VES2_1$, according to a convention predetermined at the decoder DO and which is the same as at the coder CO.

To this effect, in a corresponding manner to the coder CO of FIG. 2, the predefined values $VES2_1$ and $VES2_2$ of the second syntax element $ES_2$ are stored beforehand in a list $LTS_1$, in the buffer memory MT_D of the decoder DO of FIG. 7.

During the decoding of the current block $B_u$, only the first or the second embodiment of the syntax element $ES_2$ is implemented. By way of alternative, the first and second embodiments are implemented.

If at D5, one is dealing with the coded value $VCES1_1$ of the first syntax element $ES_1$ and if, at D6, the coded data $DC_u$ are associated with a current block $B_u$ which does not belong to the predefined zone of the current image, the coded value $VCES2_1$ or $VCES2_2$ of the second syntax element $ES_2$ is decoded at D8. If $VCES2_1=0$, on completion of this decoding D8, a decoded value $VES2_1$ of the second syntax element $ES_2$ is obtained. If $VCES2_2=1$, on completion of this decoding D8, a decoded value $VES2_2$ of the second syntax element $ES_2$ is obtained.

According to a first embodiment, if the syntax element $ES_2$ is representative of the mode of prediction of the current block $B_u$ and if, for example, $ES_2$ has been coded:

according to a first predefined value $VCES2_1=0$ indicating an inter prediction of the current block $B_u$, or according to a second predefined value $VCES2_2=1$ indicating an intra prediction of the current block $B_u$, the decoding of $VCES2_1=0$ makes it possible to obtain the value $VES2_1$ of the second syntax element $ES_2$ or the decoding of $VCES2_2=1$ makes it possible to obtain the value $VES2_2$ of the second syntax element $ES_2$.

According to a second embodiment, if the syntax element $ES_2$ is representative of the value of the residual pixels of the current block $B_u$ and if, for example, $ES_2$ has been coded:

according to a first predefined value $VCES2_1=0$ indicating residual pixels of zero value of the current block $B_u$, or according to a second predefined value $VCES2_2=1$ indicating residual pixels of non-zero value of the current block $B_u$, the decoding of $VCES2_1=0$ makes it possible to obtain the value $VES2_1$ of the second syntax element $ES_2$ or the decoding of $VCES2_2=1$ makes it possible to obtain the value $VES2_2$ of the second syntax element $ES_2$.

Such a decoding is for example an entropy decoding of CABAC ("Context Adaptive Binary Arithmetic Coder" in English) type or else an entropy decoding of arithmetical or Huffman type. This decoding is implemented by the decoding device MD_D represented in FIG. 7.

If at D5, it is the coded value $VCES1_2$ of the first syntax element $ES_1$ which has been decoded, the coded value $VCES2_1$ or $VCES2_2$ of the syntax element $ES_2$ is systematically decoded at D8.

With reference to FIG. 6A, the data of the current block $B_u$ are decoded at D9. Such a decoding is implemented by a block decoding device MDB_D represented in FIG. 7, which device is driven by the processor PROC_D.

The decoding D9 implements, at D91, a decoding of the data $DC_u$ associated with the current block $B_u$ to be decoded and which have been coded at C8 in FIG. 1A. On completion of such a decoding, is obtained a set of digital information associated with the block of quantized coefficients $Bq_u$ which was obtained at C52 in FIG. 1A.

The decoding D91 is implemented by the decoding device MD_D represented in FIG. 7.

The decoding D9 furthermore implements a dequantization D92 of the block of quantized coefficients $Bq_u$, according to a conventional dequantization operation which is the operation inverse to the quantization C82 of FIG. 1A. A current set of dequantized coefficients $BDq_u$ is then obtained. Such a dequantization is for example of scalar or vector type and is implemented by means of an inverse quantization device $MQ^{-1}\_D$, such as represented in FIG. 7, which device is driven by the processor PROC_D.

The decoding D9 furthermore implements the application D93 of a transform to the current set of dequantized coefficients $BDq_u$ which is obtained at D92. In a manner known per se, such a transform is a transform inverse to that applied to the coding at C81 in FIG. 1A, such as for example a DCT, DST, DWT, LT or other transform. In a corresponding manner to the coder CO of FIG. 2, these transforms form part of a list of transforms $LTS_2^{-1}$ which is stored beforehand in the buffer memory MT_D of the decoder DO of FIG. 7. The type of transform to be applied can be determined at the decoder conventionally, by reading, in the data signal F, the index of the transform applied to the coding. According to the invention, the type of transform to be applied can be determined by the implementation of operation D5 of FIG. 6A.

The transform application D93 is performed by a transform calculation device MTR$^{-1}$_D, such as represented in FIG. 7, which device is driven by the processor PROC_D.

The inverse quantization device MQ$^{-1}$_D and the transform calculation device MTR$^{-1}$_D are contained in a block decoding device MDB_D represented in FIG. 7, which device is driven by the processor PROC_D.

On completion of the decoding of the data of the current block, a current decoded block $BD_u$ is obtained.

In the example described here, by data is meant the pixels of the decoded block $BD_u$.

It should however be noted that by data is also meant the pixels of a current residual block decoded in the case where a prediction of the current block $B_u$ was implemented on coding and an inverse prediction is therefore implemented on decoding.

With reference to FIG. 6A, there is undertaken at D10 the writing of the current decoded block $BD_u$ into a decoded image $ID_j$.

The writing D10 is implemented by an image reconstruction device URI such as represented in FIG. 7, the device URI being driven by the processor PROC_D.

The decoding method which has just been described hereinabove is implemented for all the coded data of blocks $DC_1, DC_2, \ldots, DC_u, \ldots, DC_S$, associated respectively with the blocks $B_1, B_2, \ldots, B_u, \ldots, B_S$ to be decoded of the current image $IC_j$ considered.

A variant of the decoding method of FIG. 6A will now be described with reference to FIG. 6B.

This variant differs from the decoding method of FIG. 6A only through the fact that:
- the decoding D8 of the value $VCES2_1$ or $VCES2_2$ of the second syntax element $ES_2$ is not systematically implemented,
- the value $VCES2_1$ or $VCES2_2$ of the second syntax element $ES_2$ may be decoded even if the current block $B_u$ belongs to the predefined zone of the current image $IC_j$.

Figure 6B:
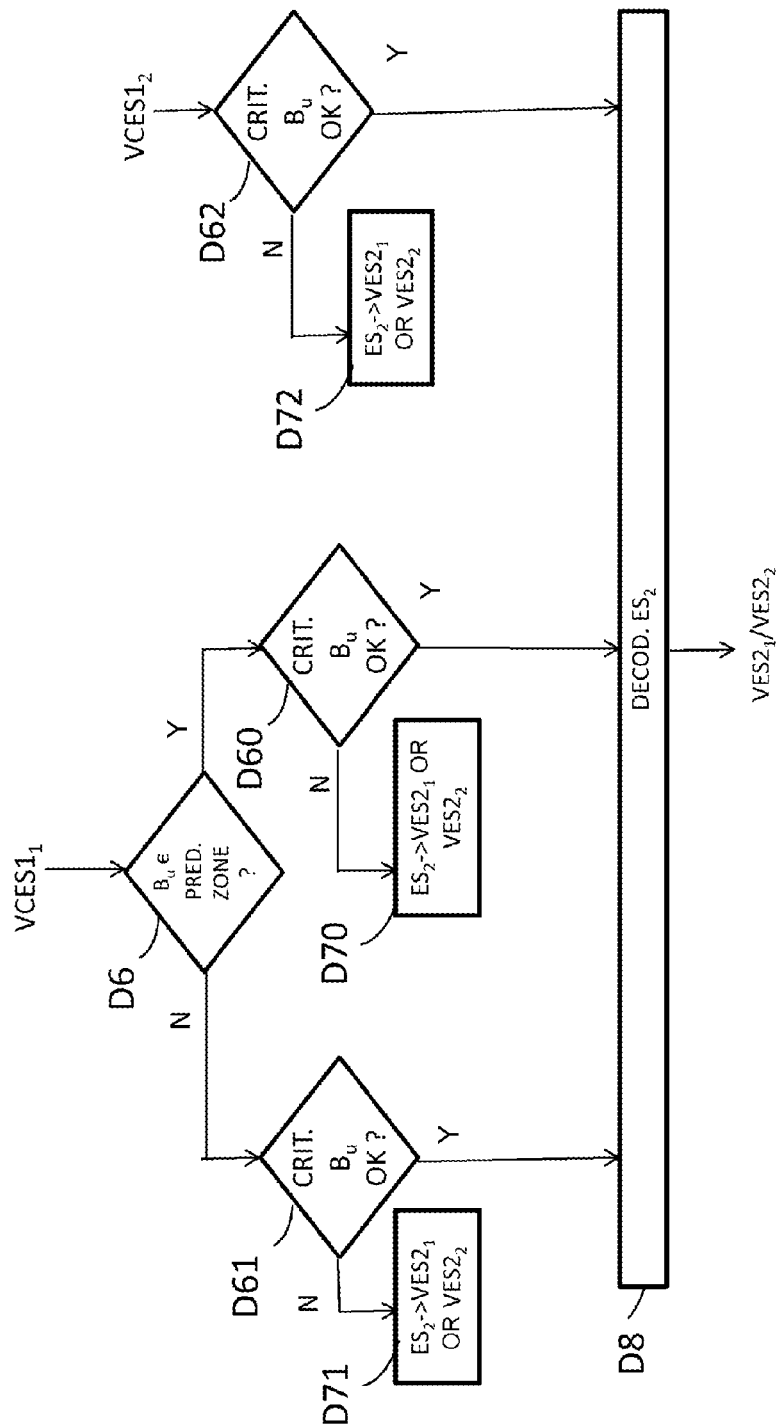
FIG. 6B represents an alternative of the decoding method of FIG. 6A.

To this effect, as represented in FIG. 6B, in the case where the set of coded data $DC_u$ is associated with a current block $B_u$ which belongs to the predefined zone of the current image $IC_j$, a criterion dependent on the characteristics of the current block is examined at D50.

If the criterion is fulfilled, the value $VCES2_1$ or $VCES2_2$ of the second syntax element $ES_2$ is decoded at D8.

If the criterion is not fulfilled, at D70, the syntax element $ES_2$ is set, as a function of the current decoding context, directly to the predefined value $VES2_1$ or $VES2_2$ such as stored in the list $LTS_1$ of the decoder DO of FIG. 7.

In the case where the set of coded data $DC_u$ is associated with a current block $B_u$ which does not belong to the predefined zone of the current image $IC_j$, a criterion dependent on the characteristics of the current block is examined at D61.

If the criterion is fulfilled, the value $VCES2_1$ or $VCES2_2$ of the second syntax element $ES_2$ is decoded at D8.

If the criterion is not fulfilled, at D71, the syntax element $ES_2$ is set, as a function of the current decoding context, directly to the predefined value $VES2_1$ or $VES2_2$ such as stored in the list $LTS_1$ of the decoder DO of FIG. 7.

In the case where it is the coded value $VCES1_2$ of the first syntax element $ES_1$ which was decoded at D2, a criterion dependent on the characteristics of the current block is examined at D62.

If the criterion is fulfilled, the value $VCES2_1$ or $VCES2_2$ of the second syntax element $ES_2$ is decoded at D8.

If the criterion is not fulfilled, at D72, the syntax element $ES_2$ is set, as a function of the current decoding context, directly to the predefined value $VES2_1$ or $VES2_2$ such as stored in the list $LTS_1$ of the decoder DO of FIG. 7.

As a variant, just one or else two of the three operations D60, D61, D62 is implemented.

According to an exemplary criterion, in the case where the second syntax element $ES_2$ is representative of the size of the current block $B_u$ to be decoded, the value $VES2_1$ or $VES2_2$ of the syntax element $ES_2$ is compared with a predetermined size value VTP.

In the case for example of the current images represented in FIGS. 4A to 4C, for which the coded value $VCES1_1$ of the syntax element $ES_1$ indicating that the current image $IC_j$ is for example a 2D image obtained by two-dimensional projection of a 180° or 360° video is decoded at D2:
- if at D6 (FIG. 6B), the set of coded data $DC_u$ is associated with a current block $B_u$ which belongs to a predefined zone Z1, and
  - if at D60, it is determined as criterion that the size of the current block is greater than a predetermined value VTP, for example 32×32, the coded value $VCES2_1$ or $VCES2_2$ of the second syntax element $ES_2$ representative of the size of the current block $B_u$ is decoded at D8,
  - otherwise, at D70, the syntax element $ES_2$ is set, as a function of the current decoding context, directly to the predefined value $VES2_1$ or $VES2_2$ such as stored in the list $LTS_1$ of the decoder DO of FIG. 7,
- if at D6 (FIG. 6B), the current block $B_u$ does not belong to the predefined zone Z1, stated otherwise belongs to the predefined zone Z2 of the current image $IC_j$, and
  - if at D61, it is determined as criterion that the size of the current block is greater than a predetermined value VTP, for example 16×16, the value $VCES2_1$ or $VCES2_2$ of the second syntax element $ES_2$ representative of the size of the current block $B_u$ is decoded at D8,
  - otherwise, at D71, the syntax element $ES_2$ is set, as a function of the current decoding context, directly to the predefined value $VES2_1$ or $VES2_2$ such as stored in the list $LTS_1$ of the decoder DO of FIG. 7.

In the case for example of a current image (not represented), for which the coded value $VCES1_2$ of the syntax element $ES_1$ indicating that the current image $IC_j$ is for example a conventional 2D image of fixed type or forming part of a sequence of images following one another temporally is decoded at D2:
- if at D62 (FIG. 6B), it is determined as criterion that the size of the current block is greater than a predetermined value VTP, for example 8×8, the coded value $VCES2_1$ or $VCES2_2$ of the second syntax element $ES_2$ representative of the size of the current block $B_u$ is decoded at D8,
- otherwise, at D72, the syntax element $ES_2$ is set, as a function of the current decoding context, directly to the predefined value $VES2_1$ or $VES2_2$ such as stored in the list $LTS_1$ of the decoder DO of FIG. 7.

In the case of the current image $IC_j$ represented in FIG. 4D, for which the coded value $VCES1_1$ of the syntax element $ES_1$ indicating that the current image $IC_j$ is for example a 2D image obtained by two-dimensional projection of a 360° video is decoded at D2:

if at D6 (FIG. 6B), the set of coded data $DC_u$ is associated with a current block $B_u$ which belongs to the predefined zone Z1, and
    if at D60, it is determined as criterion that the size of the current block is greater than a predetermined value VTP, for example 32×32, the coded value $VCES2_1$ or $VCES2_2$ of the second syntax element $ES_2$ representative of the size of the current block $B_u$ is decoded at D8,
    otherwise, at D70, the syntax element $ES_2$ is set, as a function of the current decoding context, directly to the predefined value $VES2_1$ or $VES2_2$ such as stored in the list $LTS_1$ of the decoder DO of FIG. 7,
if at D6 (FIG. 6B), the current block $B_u$ belongs to the predefined zone Z2 of the current image $IC_j$, and
    if at D61, it is determined as criterion that the size of the current block is greater than a predetermined value VTP, for example 16×16, the coded value $VCES2_1$ or $VCES2_2$ of the second syntax element $ES_2$ representative of the size of the current block $B_u$ is decoded at D8,
    otherwise, at D71, the syntax element $ES_2$ is set, as a function of the current decoding context, directly to the predefined value $VES2_1$ or $VES2_2$ such as stored in the list $LTS_1$ of the decoder DO of FIG. 7,
if at D6 (FIG. 6B), the current block $B_u$ belongs to the predefined zone Z3, and
    if at D62, it is determined as criterion that the size of the current block is greater than a predetermined value VTP, for example 8×8, the value $VCES2_1$ or $VCES2_2$ of the second syntax element $ES_2$ representative of the size of the current block $B_u$ is decoded at D8,
    otherwise, at D72, the syntax element $ES_2$ is set, as a function of the current decoding context, directly to the predefined value $VES2_1$ or $VES2_2$ such as stored in the list $LTS_1$ of the decoder DO of FIG. 7.

In the case for example of a current image represented in FIG. 5B, for which the coded value $VCES1_1$ of the syntax element $ES_1$ indicating that at least two zones of the current image $IC_j$ are decoded according to a different level of decoding quality is decoded at D2:
    if at D6 (FIG. 6B), the set of coded data $DC_u$ is associated with a current block $B_u$ which belongs to a predefined zone Z1, and
        if at D60, it is determined as criterion that the size of the current block is greater than a predetermined value VTP, for example 32×32, the coded value $VCES2_1$ or $VCES2_2$ of the second syntax element $ES_2$ representative of the size of the current block $B_u$ is decoded at D8,
        otherwise, at D70, the syntax element $ES_2$ is set, as a function of the current decoding context, directly to the predefined value $VES2_1$ or $VES2_2$ such as stored in the list $LTS_1$ of the decoder DO of FIG. 7,
    if at D6 (FIG. 6B), the current block $B_u$ does not belong to the predefined zone Z1, stated otherwise belongs to the predefined zone Z2 of the current image $IC_j$, and
        if at D61, it is determined as criterion that the size of the current block is greater than a predetermined value VTP, for example 16×16, the value $VCES2_1$ or $VCES2_2$ of the second syntax element $ES_2$ representative of the size of the current block $B_u$ is decoded at D8,
        otherwise, at D71, the syntax element $ES_2$ is set, as a function of the current decoding context, directly to the predefined value $VES2_1$ or $VES2_2$ such as stored in the list $LTS_1$ of the decoder DO of FIG. 7.

In the case for example of the current image $IC_j$ represented at the bottom right in FIG. 5A, for which the coded value $VCES1_2$ of the syntax element $ES_1$ indicating that each zone of the current image $IC_j$ is decoded according to one and the same level of decoding quality is decoded at D2:
    if at D62 (FIG. 6B), it is determined as criterion that the size of the current block is greater than a predetermined value VTP, for example 8×8, the coded value $VCES2_1$ or $VCES2_2$ of the second syntax element $ES_2$ representative of the size of the current block $B_u$ is decoded at D8,
    otherwise, at D72, the syntax element $ES_2$ is set, as a function of the current decoding context, directly to the predefined value $VES2_1$ or $VES2_2$ such as stored in the list $LTS_1$ of the decoder DO of FIG. 7.

It goes without saying that the embodiments which have been described hereinabove have been given purely by way of wholly nonlimiting indication, and that numerous modifications may be easily made by the person skilled in the art without however departing from the scope of the invention.

The invention claimed is:

1. A coding method for coding at least one image split into blocks, the at least one image comprising a predefined zone to be coded, wherein the method comprises the following acts performed by a coding device:
    for a current block to be coded of the at least one image, coding data of the current block, said coding comprising:
    coding a first syntax element associated with activation or non-activation of a coding of at least one coding parameter of the current block,
    if the first syntax element is coded by a first predefined value, coding a second syntax element representative of a value of said at least one coding parameter only if the current block belongs to the predefined zone of the image,
    if the first syntax element is coded by a second predefined value), coding the second syntax element, whether or not the current block belongs to the predefined zone.

2. The coding method as claimed in claim 1, in which if the current block belongs to said predefined zone of the image, the coding of the second syntax element representative of the value of said at least one coding parameter is implemented as a function of a criterion dependent on characteristics of the current block.

3. The coding method as claimed in claim 1, in which the first and second predefined values of the first syntax element are representative of an obtaining of said at least one image by projection of a video captured according to a plurality of viewing angles or else on the basis of a video comprising two-dimensional images following one another temporally.

4. The coding method as claimed in claim 1, in which the first and second predefined values of the first syntax element are representative of a choice of whether or not to apply a different level of coding quality to at least two zones of said at least one image.

5. A device for coding at least one image split into blocks, the at least one image comprising a predefined zone to be coded, comprising a processing circuit which is configured to:
    for a current block to be coded of the at least one image, coding data of the current block, said coding comprising:

coding a first syntax element associated with activation or non-activation of a coding of at least one coding parameter of the current block, if the first syntax element is coded by a first predefined value, coding a second syntax element representative of a value of said at least one coding parameter, only if the current block belongs to the predefined zone of the image, if the first syntax element is coded by a second representative predefined value, coding the second syntax element, whether or not the current block belongs to the predefined zone.

6. A non-transitory computer-readable recording medium on which is recorded a computer program comprising program code instructions for executing a method for coding at least one image split into blocks, when said program is executed by a processor of a coding device, wherein the at least one image comprises a predefined zone to be coded and wherein the instructions configure the coding device to perform acts comprising:

for a current block to be coded of the at least one image, coding data of the current block:

coding a first syntax element associated with activation or non-activation of a coding of at least one coding parameter of the current block, if the first syntax element is coded by a first predefined value, coding a second syntax element representative of a value of said at least one coding parameter only if the current block belongs to the predefined zone of the image, and if the first syntax element is coded by a second predefined value, coding the second syntax element, whether or not the current block belongs to the predefined zone.

7. A decoding method for decoding a data signal representative of at least one coded image having been split into blocks, the at least one coded image comprising a predefined zone to be decoded, wherein the method comprises the following acts performed by a decoding device:

for a current block to be decoded of the at least one coded image, decoding data of the current block, comprising:

decoding a first syntax element contained in said data signal, said first syntax element being associated with activation or non-activation of a decoding of at least one coding parameter of the current block, if the first decoded syntax element has a first predefined value, decoding a second syntax element representative of a value of said at least one coding parameter only if the current block belongs to the predefined zone of the image, and if the first decoded syntax element has a second predefined value, decoding the second syntax element whether or not the current block belongs to the predefined zone.

8. The decoding method as claimed in claim 7, in which if the current block belongs to said predefined zone of the image, the decoding of the second syntax element representative of the value of said at least one coding parameter is implemented as a function of a criterion dependent on characteristics of the current block.

9. The decoding method as claimed in claim 7, in which the first and second predefined values of the first syntax element are representative of an obtaining of said at least one image by projection of a video captured according to a plurality of viewing angles or else on the basis of a video comprising two-dimensional images following one another temporally.

10. The decoding method as claimed in claim 7, in which the first and second predefined values of the first syntax element are representative of a choice of whether or not to apply a different level of decoding quality to at least two zones of said at least one image.

11. A device for decoding a data signal representative of at least one coded image having been split into blocks, the at least one coded image comprising a predefined zone to be decoded, comprising a processing circuit which is configured to:

for a current block to be decoded of the at least one coded image, decoding data of the current block, comprising:

decoding first syntax element contained in said data signal, said first syntax element being associated with activation or non-activation of a decoding of at least one coding parameter of the current block, if the first decoded syntax element has a first predefined value, decoding a second syntax element representative of a value of said at least one coding parameter, only if the current block belongs to the predefined zone of the image, and if the first decoded syntax element has a second predefined value, decoding the second syntax element whether or not the current block belongs to the predefined zone.

12. A non-transitory computer-readable recording medium on which is recorded a computer program comprising program code instructions for executing a method for decoding a data signal representative of at least one coded image having been split into blocks, when said program is executed by a processor of a decoding device, wherein the at least one coded image comprises a predefined zone to be decoded and wherein the instructions configure the decoding device to perform acts comprising:

for a current block to be decoded, decoding data of the current block, comprising:

decoding first syntax element contained in said data signal, said first syntax element being associated with activation or non-activation of a decoding of at least one coding parameter of the current block, if the first decoded syntax element has a first predefined value, decoding a second syntax element representative of a value of said at least one coding parameter, only if the current block belongs to the predefined zone of the image, and if the first decoded syntax element has a second predefined value, decoding the second syntax element whether or not the current block belongs to the predefined zone.

13. The coding method according to claim 1, further comprising:

transmitting a data signal containing the coded data of the current block to a communication network.

14. The decoding method according to claim 7, further comprising:

receiving the data signal from a communication network.

* * * * *